US010557458B2

(12) United States Patent
Nordstrom et al.

(10) Patent No.: US 10,557,458 B2
(45) Date of Patent: Feb. 11, 2020

(54) INTEGRATED TETHER AND MOORING WITH FLOATING PLATFORM FOR ENERGY KITE

(71) Applicant: Makani Technologies LLC, Alameda, CA (US)

(72) Inventors: Charles Nordstrom, Berkley, CA (US); Fort Felker, Mountain View, CA (US)

(73) Assignee: Makani Technologies LLC, Alameda, CA (US)

( * ) Notice: Subject to any disclaimer, the term of this patent is extended or adjusted under 35 U.S.C. 154(b) by 572 days.

(21) Appl. No.: 15/365,249

(22) Filed: Nov. 30, 2016

(65) Prior Publication Data
US 2018/0149137 A1    May 31, 2018

(51) Int. Cl.
| F03D 13/25 | (2016.01) |
| F03D 9/25 | (2016.01) |
| B63B 35/50 | (2006.01) |
| B64C 39/02 | (2006.01) |
| B64F 3/02 | (2006.01) |

(52) U.S. Cl.
CPC ............. *F03D 13/25* (2016.05); *B63B 35/50* (2013.01); *B64C 39/022* (2013.01); *B64F 3/02* (2013.01); *F03D 9/255* (2017.02); *F05B 2240/923* (2013.01); *F05B 2240/93* (2013.01); *F05B 2240/95* (2013.01)

(58) Field of Classification Search
CPC . F03D 13/25; F03D 9/255; F03D 5/00; B63B 35/50; B63B 2035/446; B64C 39/022; B64F 3/02; F05B 2240/921; F05B 2240/923; F05B 2240/93; F05B 2240/95; Y02E 10/70; Y02E 10/727
See application file for complete search history.

(56) References Cited

U.S. PATENT DOCUMENTS 7,296,971 B2    11/2007 Borgen
7,456,515 B2    11/2008 Nielsen
(Continued)

FOREIGN PATENT DOCUMENTS

| WO | 2010143214 A1 | 12/2010 |
| WO | 2013096345 A1 | 6/2013 |
| WO | 2016059040 A1 | 4/2016 |

OTHER PUBLICATIONS

International Searching Authority, International Search Report and Written Opinion dated Feb. 27, 2018, issued in connection with International Patent Application No. PCT/US2017/061252, filed on Nov. 14, 2017, 16 pages.

*Primary Examiner* — Rodney A Bonnette
(74) *Attorney, Agent, or Firm* — McDonnell Boehnen Hulbert & Berghoff LLP

(57) ABSTRACT

Offshore airborne wind turbine systems with an aerial vehicle connected to an undersea anchor via a tether are disclosed. A floating landing platform may be coupled to the tether and be dragged along the surface of the water along with the tether. The landing platform may be designed such that the tether can freely pass through the platform, allowing the aerial vehicle to ascend, descend, move laterally, and in crosswind flight, without creating a significant tension load on landing platform. The landing platform may also include a tether drive mechanism that can actively move the tether through the platform, thus changing the platform's location along the length of the tether.

19 Claims, 19 Drawing Sheets

(56) References Cited

U.S. PATENT DOCUMENTS

| | | |
|---|---|---|
| 7,504,741 B2 | 3/2009 | Wrage et al. |
| 9,003,631 B2 | 4/2015 | Yamamoto et al. |
| 2008/0240864 A1 | 10/2008 | Belinsky |
| 2010/0026007 A1 | 2/2010 | Joeben |
| 2010/0290839 A1 | 11/2010 | Meller |
| 2011/0131970 A1* | 6/2011 | Johnston ............... B63B 21/508 60/497 |
| 2013/0134261 A1 | 5/2013 | Goldstein |
| 2015/0158600 A1 | 6/2015 | Hachtmann et al. |
| 2015/0183516 A1* | 7/2015 | Vander Lind ......... B64C 39/022 244/155 R |
| 2015/0232200 A1* | 8/2015 | Vander Lind ......... B64C 39/022 244/110 C |
| 2015/0275861 A1 | 10/2015 | Goldstein |
| 2016/0318628 A1 | 11/2016 | Vander Lind |
| 2017/0363070 A1* | 12/2017 | Hart ........................ F03D 13/25 |
| 2018/0156199 A1* | 6/2018 | Nelson ...................... F03D 9/25 |

* cited by examiner

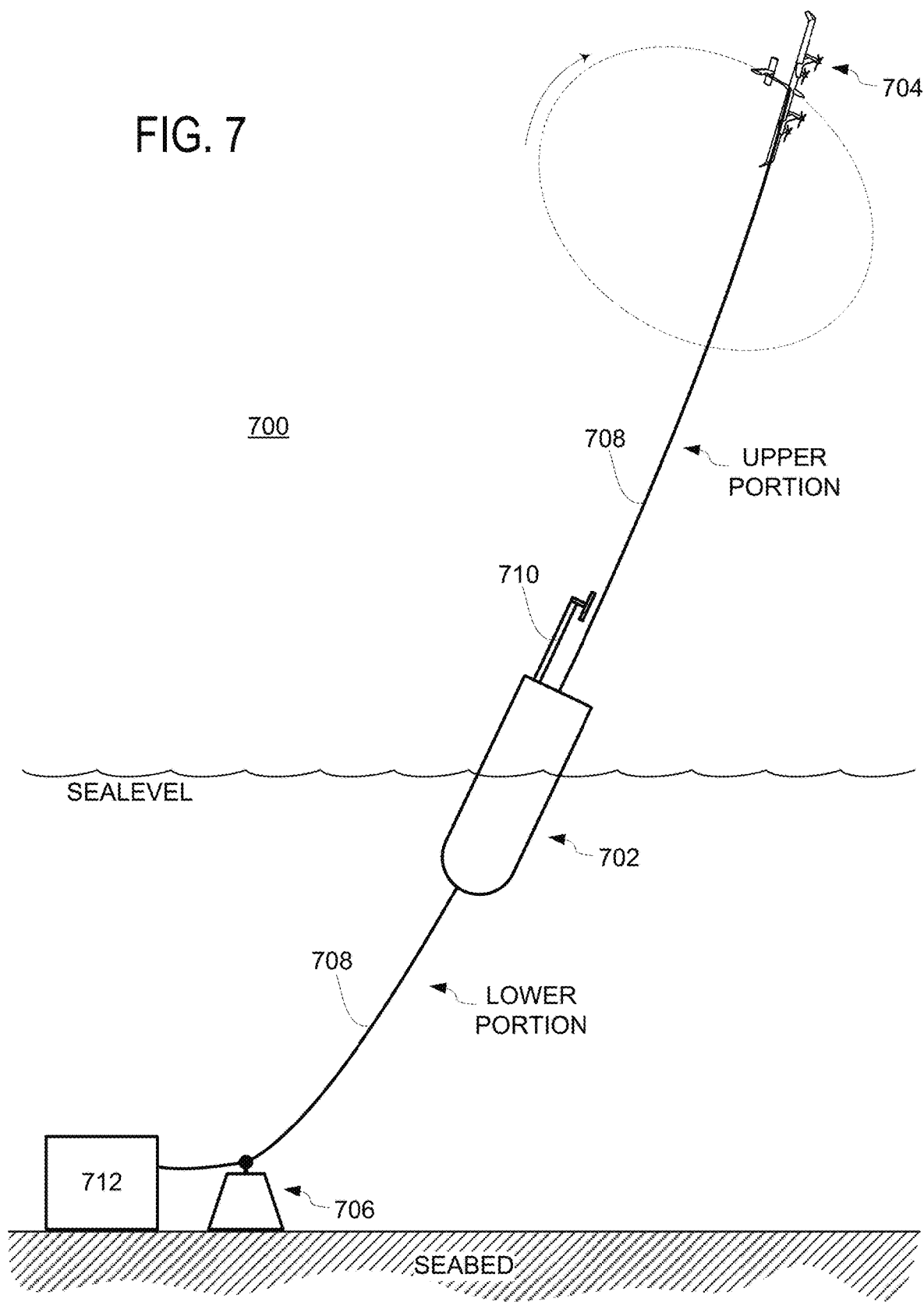

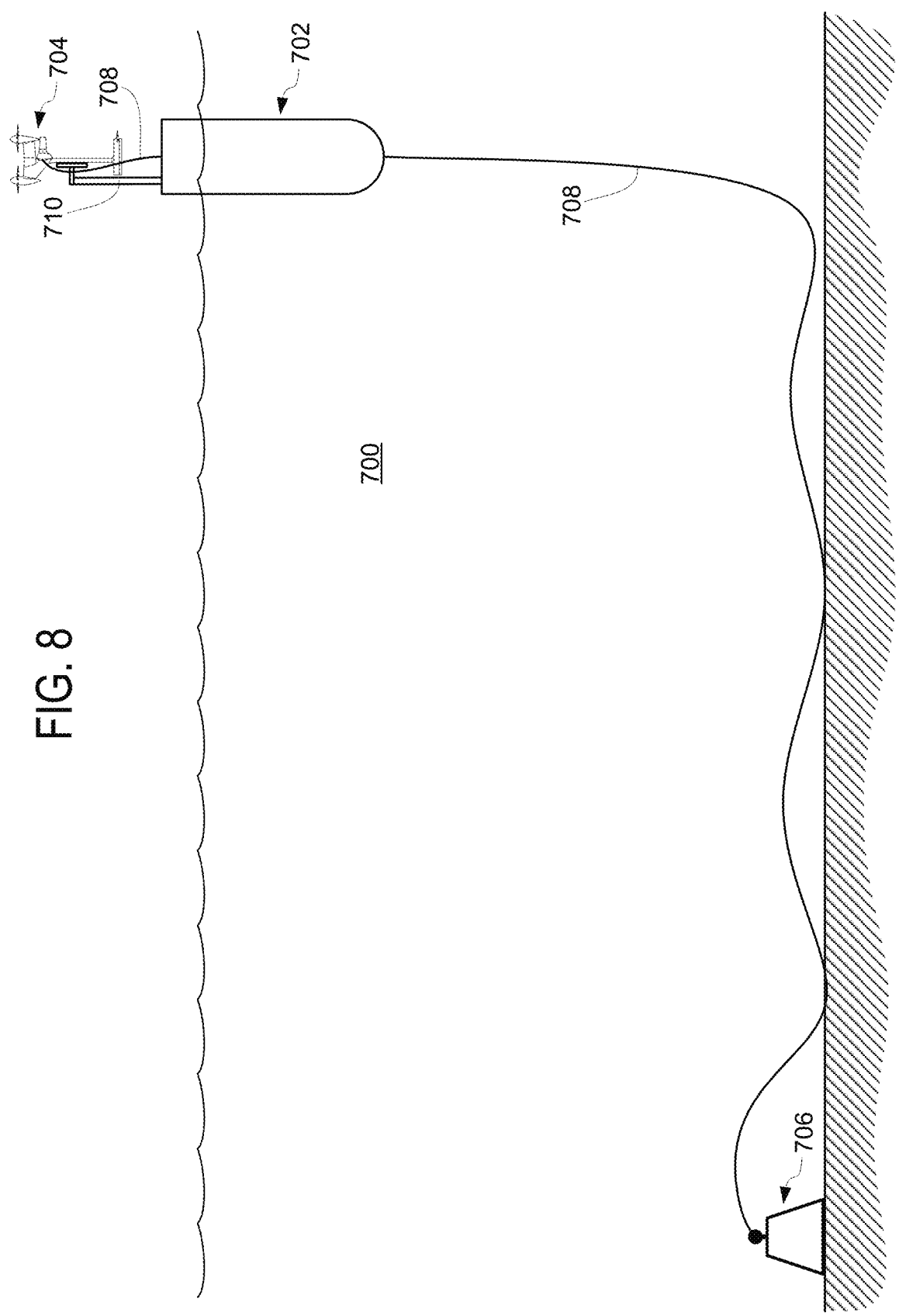

US 10,557,458 B2

INTEGRATED TETHER AND MOORING WITH FLOATING PLATFORM FOR ENERGY KITE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine or AWT.

SUMMARY

An offshore airborne wind turbine system now provides a viable way to harness wind energy in offshore applications that were previously unavailable. Offshore airborne wind turbine systems with an aerial vehicle connected to an undersea anchor via a tether are described herein. A floating landing platform may be coupled to the tether such that the platform may be dragged along as the tether moves through the water as a result of movement by the aerial vehicle, though the tether is free to move through the platform along a length of the tether. Also described herein is a tether drive mechanism on the floating platform that may drive the tether through the platform, thus actively positioning the platform along the tether. This airborne wind turbine system does not require large towers attached to the seabed and is therefore suitable for use in deep offshore locations as it utilizes a floating platform and a tether (that also functions as a mooring line) that may be simply moored to the ocean floor.

In one aspect, an offshore airborne wind turbine system may include an aerial vehicle, an underwater anchor, and a tether. The tether may include an insulated electrical conductor, an upper portion secured to the aerial vehicle, and a lower portion secured to the underwater anchor. The system may also include a floating platform configured as a landing platform for the aerial vehicle. The tether may pass through the floating platform along a reference axis and be captured by the floating platform such that the tether is constrained in movement relative to the floating platform in a plane perpendicular to the reference axis and such that the tether can freely move through the floating platform along the reference axis.

In another aspect, an offshore airborne wind turbine system may include an aerial vehicle, an underwater anchor, and a tether. The tether may include an insulated electrical conductor, an upper portion secured to the aerial vehicle, and a lower portion secured to the underwater anchor. The system may also include a floating platform configured as a landing platform for the aerial vehicle. The tether may pass through the floating platform along a reference axis and the floating platform may include a tether drive that captures the tether and constrains movement of the tether relative to the floating platform in a plane perpendicular to the reference axis. The tether drive may be configured to move the tether through the floating platform.

In another aspect, an offshore airborne wind turbine system may include an aerial vehicle, an underwater anchor, and a tether. The tether may include an insulated electrical conductor, an upper portion secured to the aerial vehicle, and a lower portion secured to the underwater anchor. A pulling force of the aerial vehicle may cause a tension load to extend axially through the tether between the aerial vehicle and the underwater anchor. The system may further include a floating platform configured as a landing platform for the aerial vehicle. The tether may pass through the floating platform along a reference axis and may be captured by the floating platform such that the tether is constrained in movement relative to the floating platform in a plane perpendicular to the reference axis and such that the tether can freely move through the floating platform along the reference axis.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 7 depicts an offshore airborne wind turbine system with a flying aerial vehicle.

FIG. 8 depicts an offshore airborne wind turbine system with a landed aerial vehicle.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. OVERVIEW

Example embodiments herein generally relate to airborne wind turbine systems generally and offshore airborne wind turbine systems with an aerial vehicle connected to an undersea anchor via a tether. In some embodiments, a floating landing platform may be coupled to the tether and be passively or actively dragged along the surface of the water along with the tether. The landing platform may be designed such that the tether can freely pass through the platform, allowing the aerial vehicle to ascend, descend, move laterally, and in crosswind flight, without creating a significant tension load on landing platform. The landing platform may also include a tether drive mechanism that can actively move the tether through the platform, thus changing the platform's location along the length of the tether. Beneficially, embodiments described herein may eliminate the need to store some or all of the tether on a winch reel. Additionally, the simpler load paths of the tether and platform may lead to lighter and cheaper structures. For example, the floating platform need not carry flight loads from kite because loads stay in the tether and go directly to single anchor.

Systems and information described with respect to FIGS. 1 through 6C are generally illustrative of airborne wind turbines and may apply to offshore airborne wind turbines. Systems described with respect to FIG. 7 and beyond are illustrative of offshore airborne wind turbines.

II. ILLUSTRATIVE SYSTEMS

A. Airborne Wind Turbine (AWT)

Figure 1:
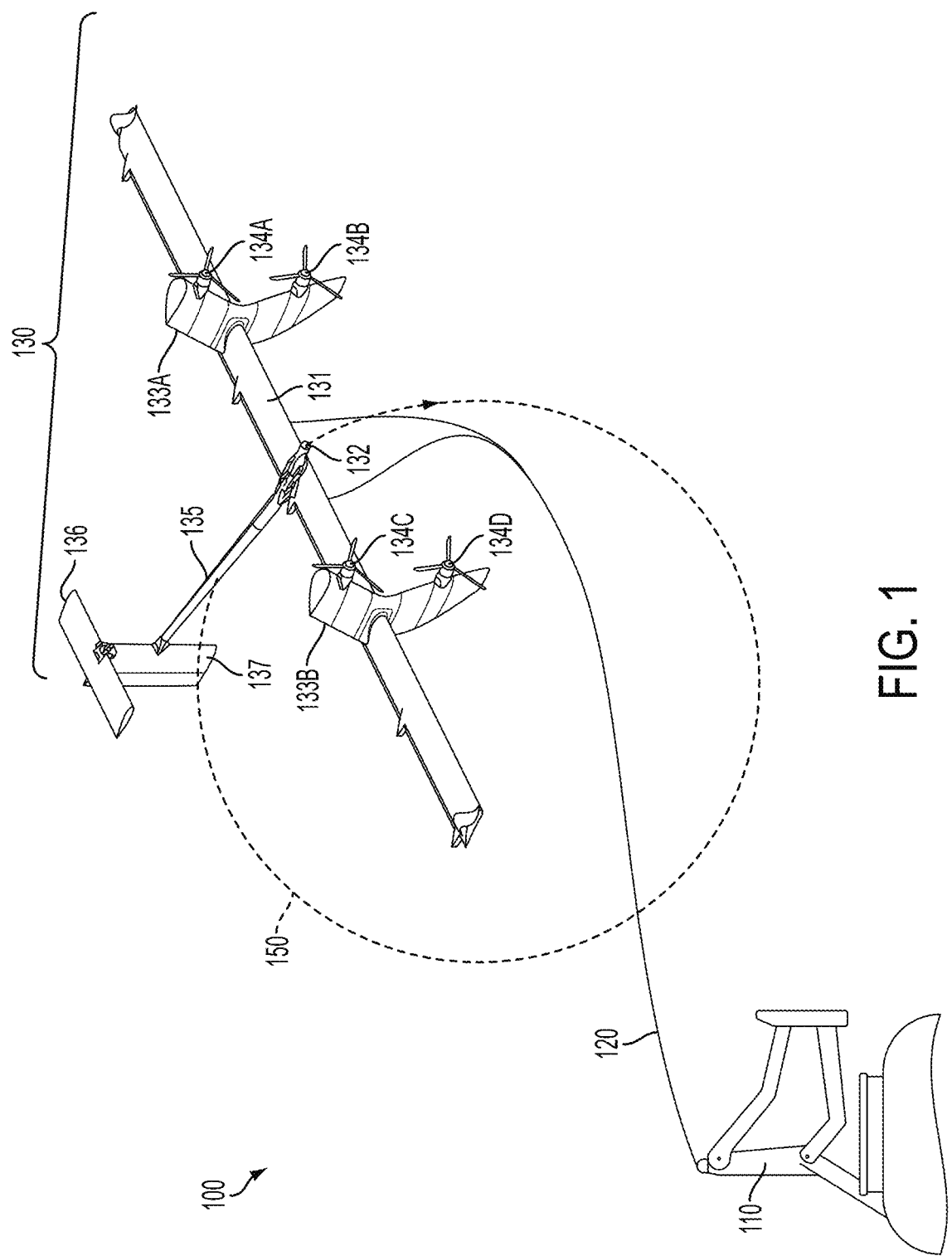
FIG. 1 depicts an Airborne Wind Turbine (AWT), according to an example embodiment.

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be configured to hold and/or support the aerial vehicle 130 until it is in an operational mode. The ground station 110 also may be configured to allow for the repositioning of the aerial vehicle 130 such that deployment of aerial vehicle 130 is possible. Further, the ground station 110 may be configured to receive the aerial vehicle 130 during a landing. The ground station 110 may be formed of any material that can suitably keep the aerial vehicle 130 attached and/or anchored to the ground while in hover flight, forward flight, and/or crosswind flight. In some implementations, a ground station 110 may be configured for use on land. However, a ground station 110 also may be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the deployed tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 also may be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may include or take the form of various types of devices, such as a kite (as illustrated in FIG. 1), a wing, and/or an airplane, among other possibilities. The aerial vehicle 130 may be formed of structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced above and below the main wing 131. In some examples, a vertical spacing between corresponding rotors (e.g., rotor 134A and rotor 134B or rotor 134C and rotor 134D) may be 0.5 to 3 meters.

The rotors 134A-D may be configured to drive one or more motor-generators for the purpose of generating electrical energy when the vehicle is operated in an electrical power generation mode. The rotors 134A-D may each include one or more blades, such as two, three, four, five, or more blades. The one or more rotor blades may rotate via interactions with the wind (or apparent wind) and be used to drive the one or more motor-generators. In addition, the rotors 134A-D also may be configured to provide a thrust to the aerial vehicle 130 during flight. With this arrangement, each of the rotors 134A-D may function as a propulsion units, such as a propeller, driven by a motor-generators when the vehicle is operated in a thrust flight mode. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 to 6 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 1 to 5 meters. Further, in some examples, the tail wing 136 may be located above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
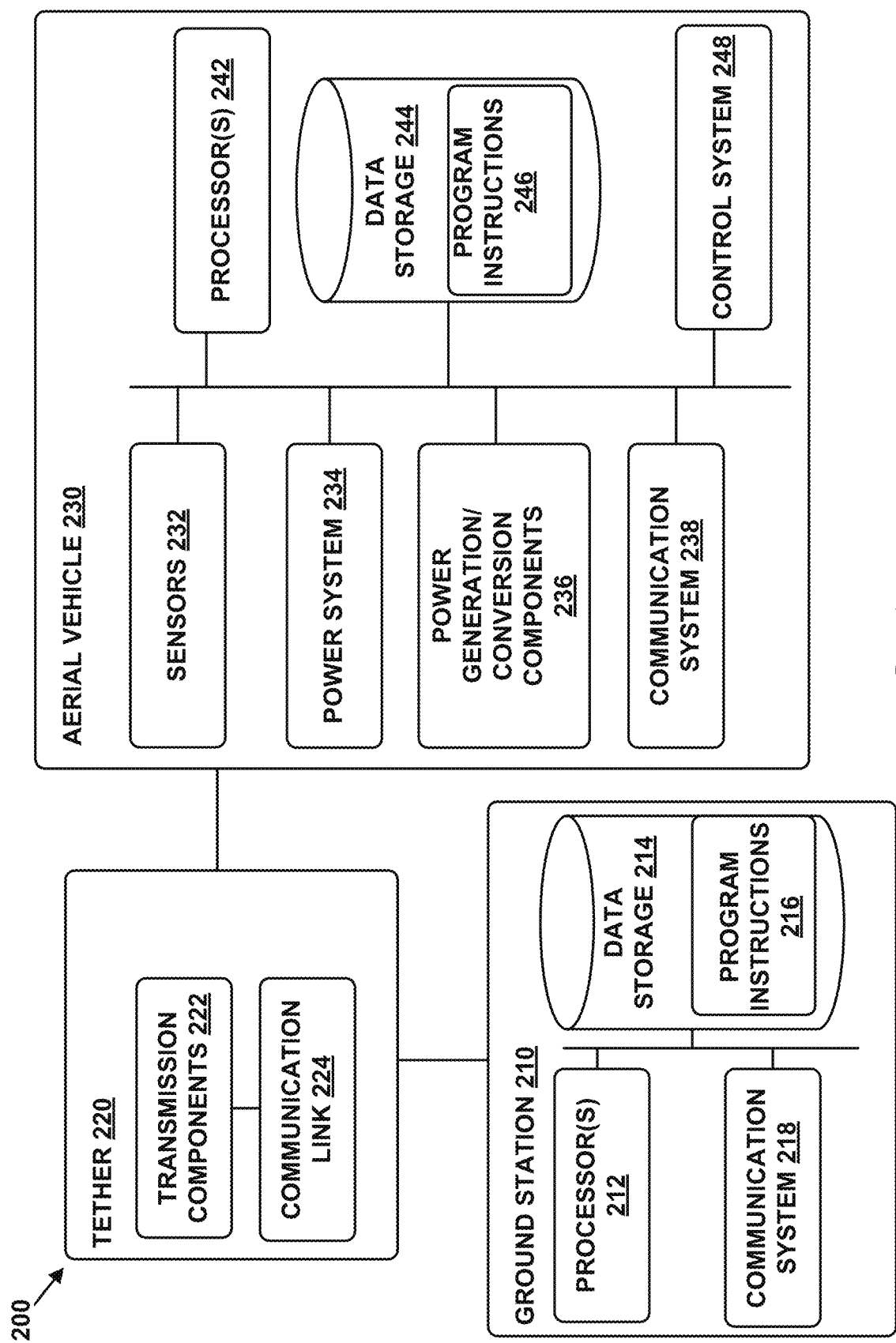
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUS are commercially available in low-cost, low-power packages. For instance, the IMU may take the form of or include a miniaturized MicroElectroMechanical System (MEMS) or a NanoElectroMechanical System (NEMS). Other types of IMUs also may be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more motor-generators, such as high-speed, direct-drive motor-generators. With this arrangement, the one or more motor-generators may drive and be driven by one or more rotors, such as the rotors 134A-D. And in at least one such example, the one or more motor-generators may operate at full rated power at wind speeds of 11.5 meters per second at a capacity factor which may exceed 60 percent, and the one or more motor-generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

C. Transitioning an Aerial Vehicle from Hover Flight to Crosswind Flight

Figure 3A:
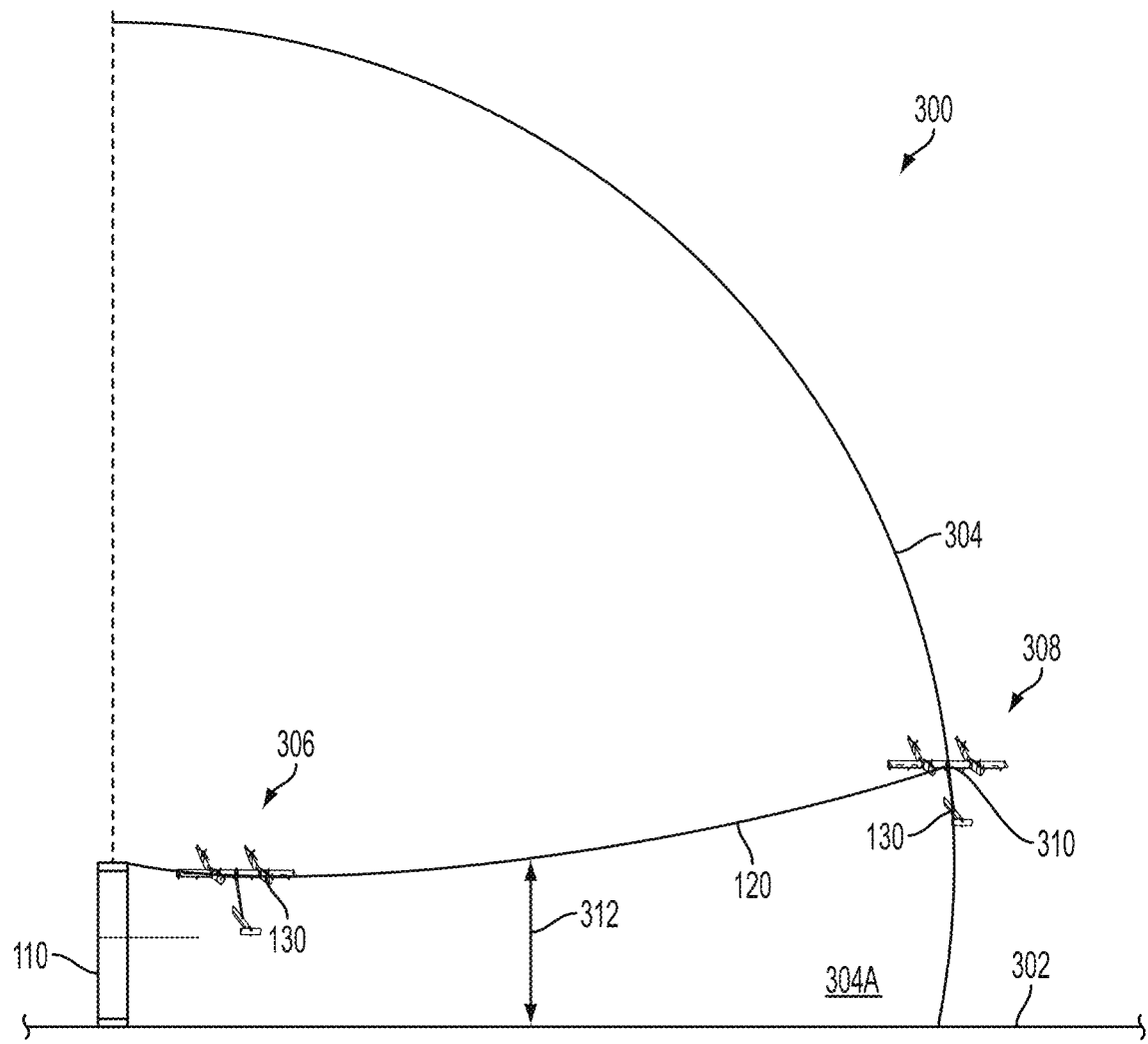
FIGS. 3A and 3B depict an example of an aerial vehicle transitioning from hover flight to crosswind flight, according to an example embodiment.
Figure 3B:
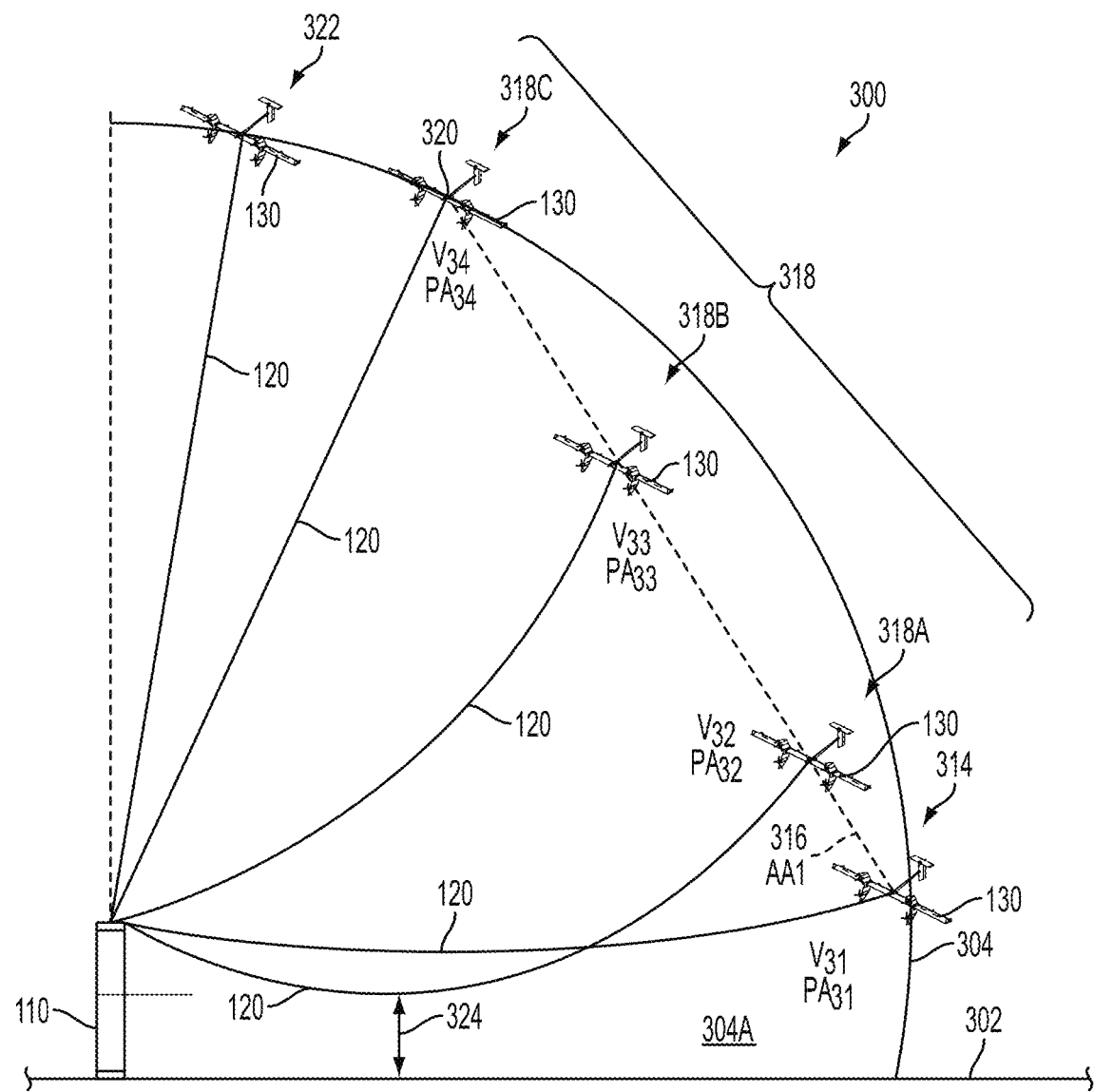

FIGS. 3A and 3B depict an example 300 of transitioning an aerial vehicle from hover flight to crosswind flight, according to an example embodiment. Hover flight may be an example of the AWT operating in thrust flight mode, with the motor-generators consuming power and driving the rotor rotation to provide thrust to the AWT. Crosswind flight may be an example of drag flight mode, with the wind or apparent wind rotating the rotors and the rotors driving the motor-generators to generate electrical power. Example 300 is generally described by way of example as being carried out by the aerial vehicle 130 described above in connection with FIG. 1. For illustrative purposes, example 300 is described in a series of actions as shown in FIGS. 3A and 3B, though example 300 could be carried out in any number of actions and/or combination of actions.

As shown in FIG. 3A, the aerial vehicle 130 is connected to the tether 120, and the tether 120 is connected to the ground station 110. The ground station 110 is located on ground 302. Moreover, as shown in FIG. 3, the tether 120 defines a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 while the aerial vehicle 130 is in the hover-flight orientation positioning the aerial vehicle 130 at a first location 310 that is substantially on the tether sphere 304. As shown in FIG. 3A, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. For example, as shown in FIG. 3A, at point 308 the tether 120 may be extended. With this arrangement, the tether 120 may be in a catenary configuration. Moreover, at point 306 and point 308, a bottom of the tether 120 may be a predetermined altitude 312 above the ground 302. With this arrangement, at point 306 and point 308 the tether 120 may not contact the ground 302.

Example 300 continues at point 314 with transitioning the aerial vehicle 130 from the hover-flight orientation to a forward-flight orientation, such that the aerial vehicle 130 moves from the tether sphere 304. As shown in FIG. 3B, the aerial vehicle 130 may move from the tether sphere 304 to a location toward the ground station 110 (which may be referred to as being inside the tether sphere 304).

When the aerial vehicle 130 is in the forward-flight orientation, the aerial vehicle 130 may engage in forward flight (which may be referred to as airplane-like flight). Forward flight may be an example of the AWT operating in thrust flight mode, with the motor-generators consuming power and driving the rotor rotation to provide thrust to the AWT. For instance, when the aerial vehicle 130 engages in forward flight, the aerial vehicle 130 may ascend. The forward-flight orientation of the aerial vehicle 130 could take the form of an orientation of a fixed-wing aircraft (e.g., an airplane) in horizontal flight. In some examples, transitioning the aerial vehicle 130 from the hover-flight orientation to the forward-flight orientation may involve a flight maneuver, such as pitching forward. And in such an example, the flight maneuver may be executed within a time period, such as less than one second.

At point 314, the aerial vehicle 130 may achieve attached flow. Further, at point 314, a tension of the tether 120 may be reduced. With this arrangement, a curvature of the tether 120 at point 314 may be greater than a curvature of the tether 120 at point 308. As one example, at point 314, the tension of the tether 120 may be less than 1 KN, such as 500 newtons (N).

Example 300 continues at one or more points 318 with operating the aerial vehicle 130 in the forward-flight orientation to ascend at an angle of ascent AA1 to a second location 320 that is substantially on the tether sphere 304. As shown in FIG. 3B, the aerial vehicle 130 may fly substantially along a path 316 during the ascent at one or more points 318. In this example, one or more points 318 is shown as three points, a point 318A, a point 318B, and a point 318C. However, in other examples, one or more points 318 may include less than three or more than three points.

In some examples, the angle of ascent AA1 may be an angle between the path 316 and the ground 302. Further, the path 316 may take various different forms in various different embodiments. For instance, the path 316 may be a line segment, such as a chord of the tether sphere 304.

In some implementations, the aerial vehicle 130 may have attached flow during the ascent. Moreover, in such an implementation, effectiveness of one or more control surfaces of the aerial vehicle 130 may be maintained. Further, in such an implementation, example 300 may involve selecting a maximum angle of ascent, such that the aerial vehicle 130 has attached flow during the ascent. Moreover, in such an implementation, example 300 may involve adjusting a pitch angle of the aerial vehicle 130 based on the maximum angle of ascent and/or adjusting thrust of the aerial vehicle 130 based on the maximum angle of ascent. In some examples, adjusting thrust of the aerial vehicle 130 may involve using differential thrusting of one or more of the rotors 134A-D of the aerial vehicle 130. The pitch angle may be an angle between the aerial vehicle 130 and a vertical axis that is substantially perpendicular to the ground 302.

As shown in FIG. 3B, at point 314 the aerial vehicle 130 may have a speed V31 and a pitch angle PA31; at point 318A the aerial vehicle 130 may have a speed V32 and a pitch angle PA32; at point 318B the aerial vehicle 130 may have a speed V33 and a pitch angle PA33; and at point 318C the aerial vehicle 130 may have a speed V34 and a pitch angle PA34.

In some implementations, the angle of ascent AA1 may be selected before point 318A. With this arrangement, the pitch angle PA31 and/or the pitch angle PA32 may be selected based on the angle of ascent AA1. Further, in some examples, the pitch angle PA32, the pitch angle PA33, and/or the pitch angle PA34 may be equal to the pitch angle PA31. However, in other examples, the pitch angles PA31, PA32, PA33, and/or PA34 may be different than each other. For instance, the pitch angle PA31 may be greater or less than pitch angles PA32, PA33, and/or PA34; the pitch angle PA32 may be greater or less than pitch angles PA33, PA34, and/or PA31; the pitch angle PA33 may be greater or less than pitch angles PA34, PA31, and/or PA32; and the pitch angle PA34 may be greater or less than pitch angles PA31, PA32, and/or PA33. Further, the pitch angle PA33 and/or PA34 may be selected and/or adjusted during the ascent. Further still, the pitch angle PA31 and/or PA32 may be adjusted during the ascent.

Moreover, in some implementations, the speed V31 and/or the speed V32 may be selected based on the angle of ascent AA1. Further, in some examples, the speed V32, the speed V33, and the speed V34 may be equal to the speed V31. However, in other examples, speeds V31, V32, V33, and V34 may be different than each other. For example, the speed V34 may be greater than the speed V33, the speed V33 may be greater than the speed V32, and the speed V32 may be greater than the speed V31. Further, speeds V31, V32, V33, and/or V34 may be selected and/or adjusted during the ascent.

In some implementations, any or all of the speeds V31, V32, V33, and/or V34 may be a speed that corresponds with a maximum (or full) throttle of the aerial vehicle 130. Further, in some implementations, at the speed V32, the aerial vehicle 130 may ascend in a forward-flight orientation. Moreover, at the speed V32, the angle of ascent AA1 may be converged.

As shown in FIG. 3B, the second location 320 may be in the air and substantially downwind of the ground station 110. The second location 320 may be oriented with respect to the ground station 110 in a similar way as the first location 310 may be oriented with respect to the ground station 110.

For example, the second location 320 may be at a first angle from an axis extending from the ground station 110 that is substantially parallel to the ground 302. In some implementations, the first angle may be 30 degrees from the axis. In some situations, the first angle may be referred to as azimuth, and the angle may be between 30 degrees clockwise from the axis and 330 degrees clockwise from the axis, such as 15 degrees clockwise from the axis or 345 degrees clockwise from the axis.

In addition, as shown in FIG. 3B, the second location 320 may be substantially upwind of the first location 310. The term "substantially upwind," as used in this disclosure, refers to exactly upwind and/or one or more deviations from exactly upwind that do not significantly impact transitioning an aerial vehicle between certain flight modes as described herein.

At one or more points 318, a tension of the tether 120 may increase during the ascent. For example, a tension of the tether 120 at point 318C may be greater than a tension of the tether 120 at point 318B, a tension of the tether 120 at point 318B may be greater than a tension of the tether 120 at point 318A. Further, a tension of the tether 120 at point 318A may be greater than a tension of the tether at point 314.

With this arrangement, a curvature of the tether 120 may decrease during the ascent. For example, a curvature the tether 120 at point 318C may be less than a curvature the tether at point 318B, and a curvature of the tether 120 at point 318B may be less than a curvature of the tether at point 318A. Further, in some examples, a curvature of the tether 120 at point 318A may be less than a curvature of the tether 120 at point 314.

Moreover, in some examples, when the aerial vehicle 130 includes a GPS receiver, operating the aerial vehicle 130 in the forward-flight orientation to ascend at an angle of ascent may involve monitoring the ascent of the aerial vehicle 130 with the GPS receiver. With such an arrangement, control of a trajectory of the aerial vehicle 130 during the ascent may be improved. As a result, the aerial vehicle 130's ability to follow one or more portions and/or points of the path 316 may be improved.

Further, in some examples, when the aerial vehicle 130 includes at least one pitot tube, operating the aerial vehicle 130 in a forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle during the ascent may be improved. As a result, the aerial vehicle 130's ability to follow one or more portions and/or points of the path 316 may be improved. The angle of attack may be an angle between a body axis of the aerial vehicle 130 and an apparent wind vector. Further, the side slip may be an angle between a direction substantially perpendicular to a heading of the aerial vehicle 130 and the apparent wind vector.

Example 300 continues at a point 322 with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver.

When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

As shown in FIG. 3B, at points 314-322 a bottom of the tether 120 may be a predetermined altitude 324 above the ground 302. With this arrangement, at points 314-322 the tether 120 may not touch the ground 302. In some examples, the predetermined altitude 324 may be less than the predetermined altitude 312. In some implementations, the predetermined altitude 324 may be greater than one half of the height of the ground station 110. And in at least one such implementation, the predetermined altitude 324 may be 6 meters.

Thus, example 300 may be carried out so that the tether 120 may not contact the ground 302. With such an arrangement, the mechanical integrity of the tether 120 may be improved. For example, the tether 120 might not catch on (or tangle around) objects located on the ground 302. As another example, when the tether sphere 304 is located above a body of water (e.g., an ocean, a sea, a lake, a river, and the like), the tether 120 might not be submersed in the water. In addition, with such an arrangement, safety of one or more people located near the ground station 110 (e.g., within the portion 304A of the tether sphere 304) may be improved.

In addition, example 300 may be carried out so that a bottom of the tether 120 remains above the predetermined altitude 324. With such an arrangement, the mechanical integrity of the tether 120 may be improved as described herein and/or safety of one or more people located near the ground station 110 (e.g., within the portion 304A of the tether sphere 304) may be improved.

Moreover, one or more actions that correspond with points 306-322 may be performed at various different time periods in various different embodiments. For instance, the one or more actions that correspond with point 306 may be performed at a first time period, the one or more actions that correspond with point 308 may be performed at a second time period, the one or more actions that correspond with point 314 may be performed at a third time period, the one or more actions that correspond with point 318A may be performed at a fourth time period, the one or more actions that correspond with point 318B may be performed at a fifth time period, the one or more actions that correspond with point 318C may be performed at a sixth time period, and the one or more actions that correspond with point 322 may be performed at a seventh time period. However, in other examples, at least some of the actions of the one or more actions that correspond with points 306-322 may be performed concurrently.

Figure 4A:
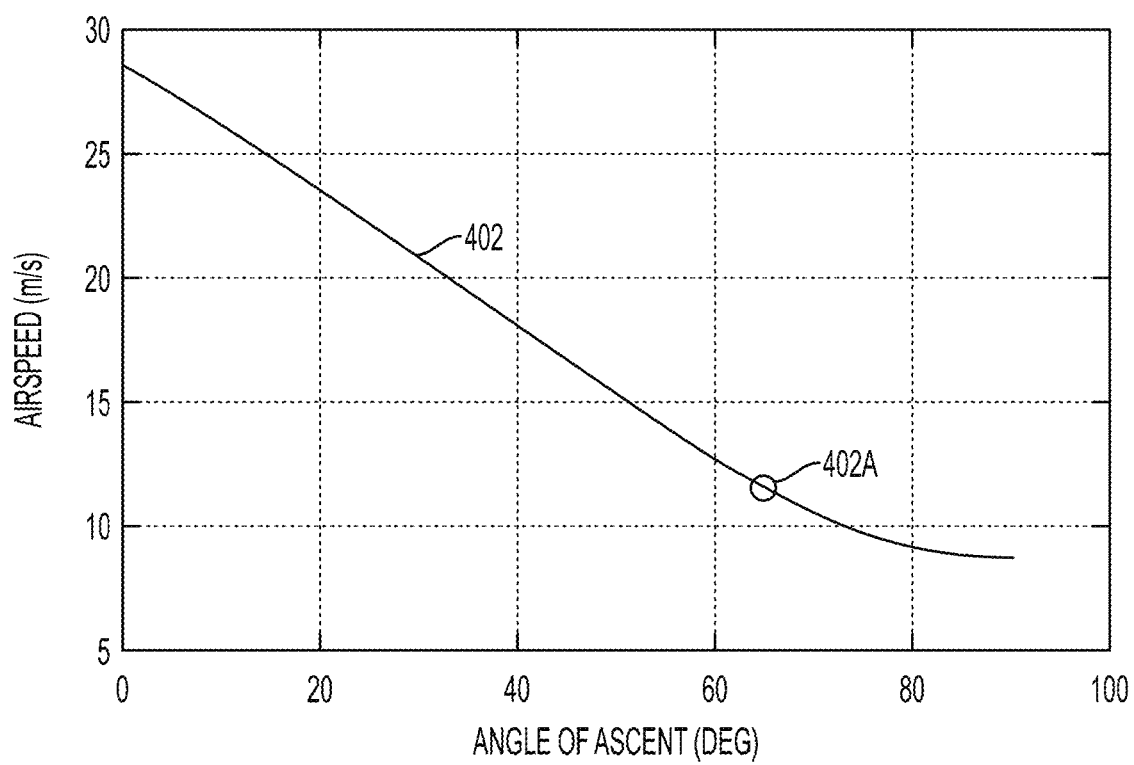
FIGS. 4A-C are graphical representations involving an angle of ascent, according to an example embodiment.
Figure 4B:
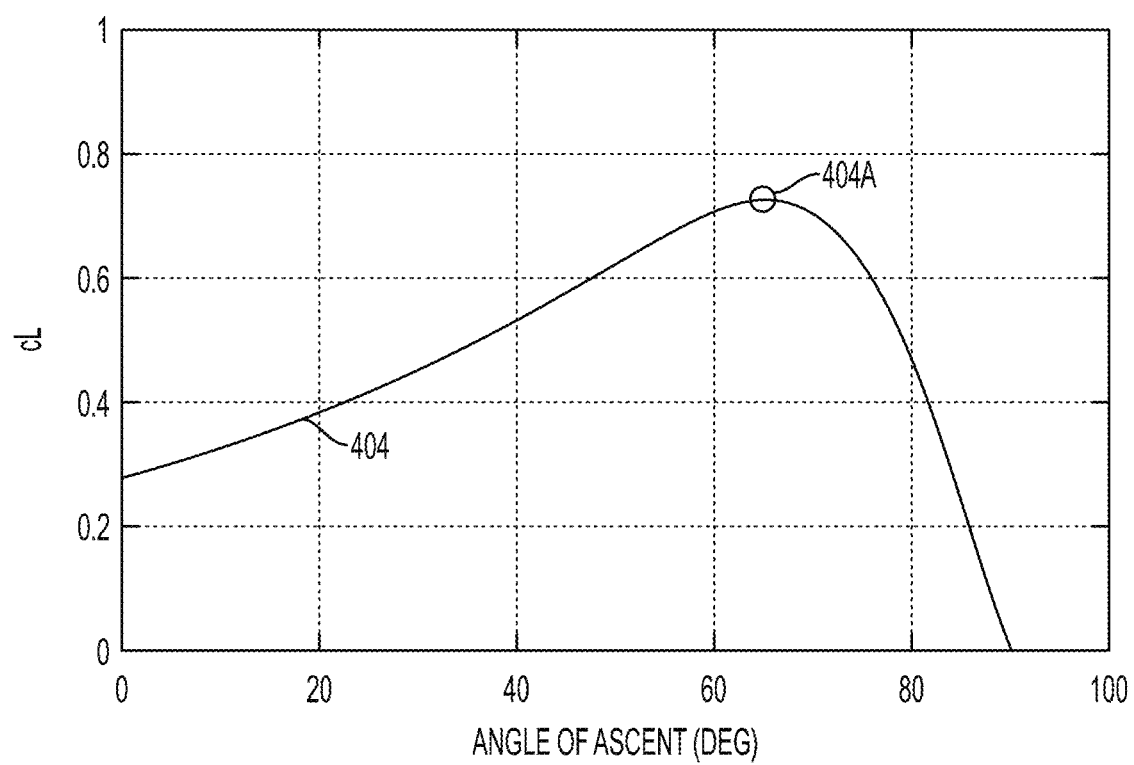
Figure 4C:
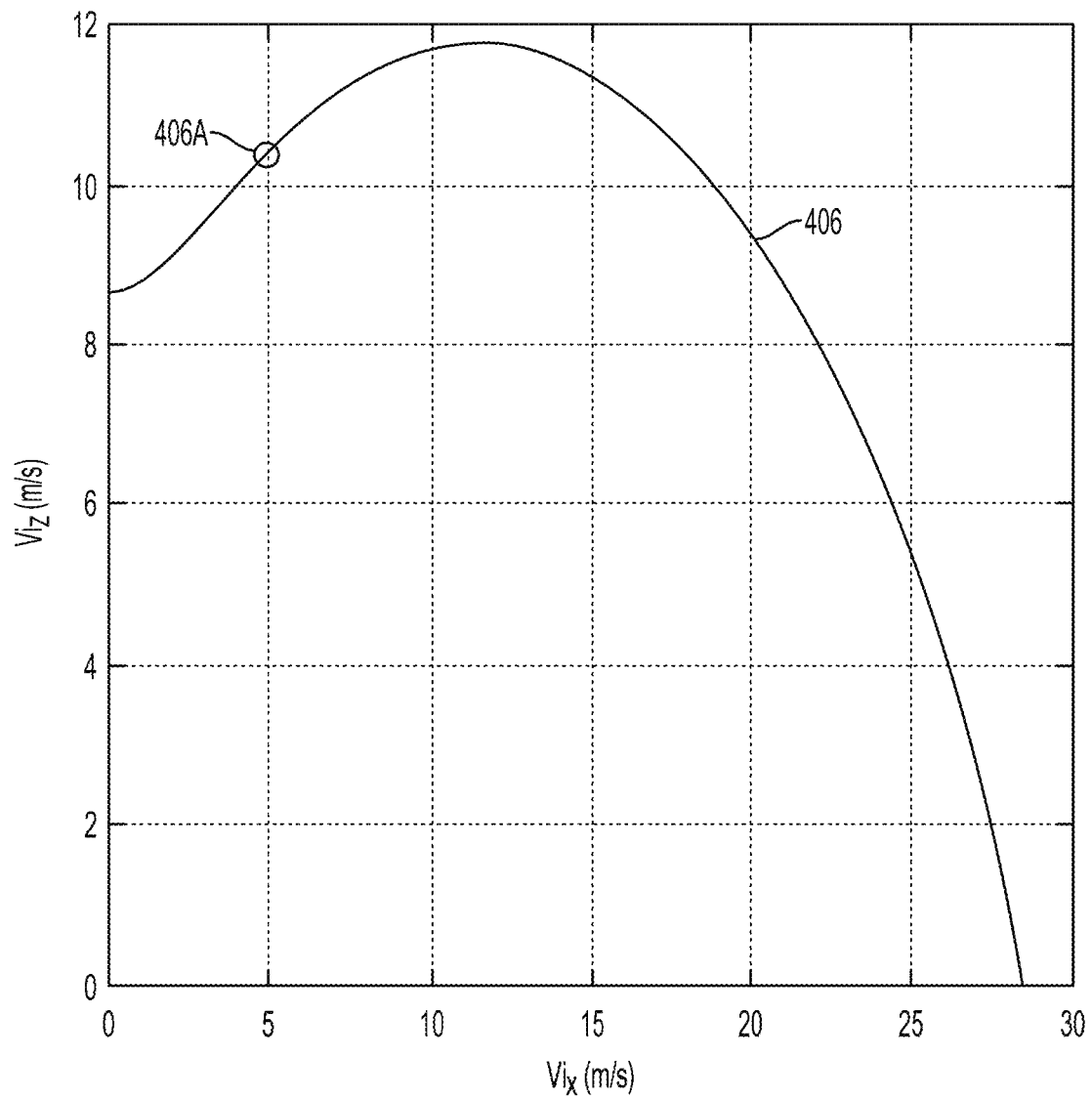

FIGS. 4A-C are graphical representations involving an angle of ascent, according to an example embodiment. In particular, FIG. 4A is a graphical representation 402, FIG. 4B is a graphical representation 404, and FIG. 4C is a graphical representation 406. Each of graphical representations 402, 404, and 406 may be based on example 300.

More specifically, in FIGS. 4A-C, an aerial vehicle in an example of transitioning the aerial vehicle from hover flight to crosswind flight may have a thrust-to-weight ratio (T/W) of 1.3 and a coefficient of drag ($C_D$) equal to the equation $3+(C_L^2/eAR\pi)$, where $C_L$ is coefficient of lift, e is span efficiency of the aerial vehicle, and AR is aspect ratio of the aerial vehicle. However, in other examples, aerial vehicles described herein may have various other thrust-to-weight ratios, such as a thrust-to-weight ratio greater than 1.2. Further, in other examples, aerial vehicles described herein may have various other values of $C_D$, such as a value of $C_D$ between 0.1 and 0.2.

As noted, FIG. 4A is the graphical representation 402. In particular, the graphical representation 402 depicts an angle of ascent of an aerial vehicle in relation to air speed. In graphical representation 402, the angle of ascent may be measured in degrees, and the airspeed may be measured in m/s. As shown in FIG. 4A, a point 402A on the graphical representation 402 may represent a maximum angle of ascent of an aerial vehicle for attached flow during an ascent, such as at one or more points 318 in example 300. In graphical representation 402, the maximum angle of ascent may be about 65 degrees, and an airspeed that corresponds with the maximum angle of ascent may be about 11 m/s.

Moreover, as noted, FIG. 4B is the graphical representation 404. In particular, the graphical representation 404 depicts an angle of ascent of an aerial vehicle in relation to $C_L$ of the aerial vehicle. In graphical representation 404, the angle of ascent may be measured in degrees, and $C_L$ may be a value without a unit of measurement. As shown in FIG. 4B, a point 404A on the graphical representation 404 may represent a maximum angle of ascent of an aerial vehicle for attached flow during an ascent, such as at one or more points 318 in example 300. In graphical representation 404, the maximum angle of ascent may be about 65 degrees, and the $C_L$ that corresponds with the maximum angle of ascent may be about 0.7.

Further, as noted, FIG. 4C is the graphical representation 406. In particular, the graphical representation 406 depicts a first component of a speed of an aerial vehicle in relation to a second component of the speed of the aerial vehicle. In graphical representation 406, the first and second components of speed of the aerial vehicle may be measured in m/s. In some examples, the first component of the speed of the aerial vehicle may be in a direction that is substantially parallel with the ground. Further, in some examples, the second component of the speed of the aerial vehicle may be in a direction that is substantially perpendicular with the ground.

As shown in FIG. 4C, a point 406A on the graphical representation 406 may represent a first and second component of a speed of the aerial vehicle when the aerial vehicle is at a maximum angle of ascent for attached flow during an ascent, such as at one or more points 318 in example 300. In graphical representation 406, the first component of the speed of the aerial vehicle that corresponds with the maximum angle of ascent may about 5 m/s, and the second component of the speed of the aerial vehicle that corresponds with the maximum angle of ascent may be about 10.25 m/s.

Figure 5A:
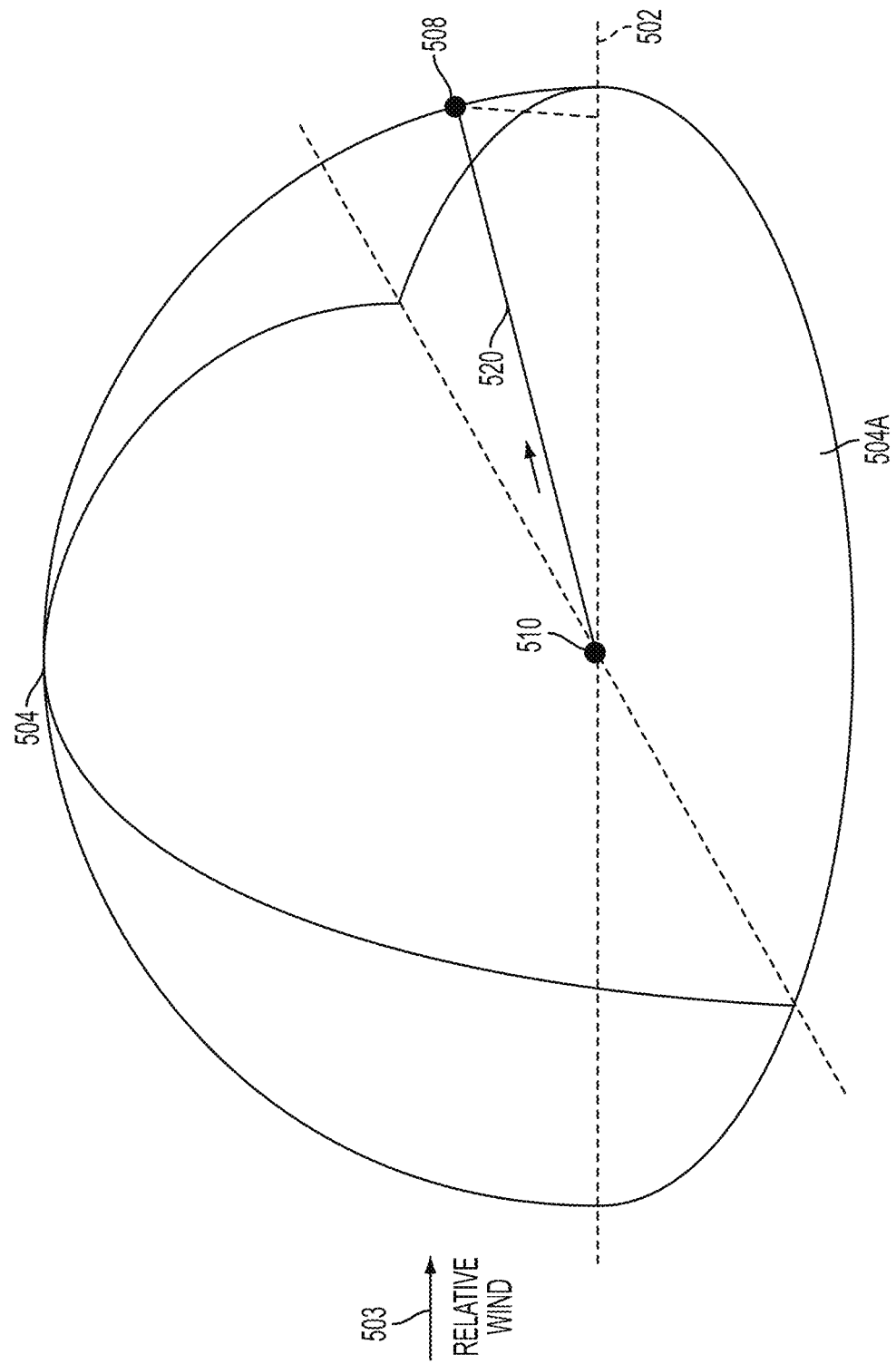
FIGS. 5A and 5B depict a tether sphere, according to an example embodiment.
Figure 5B:
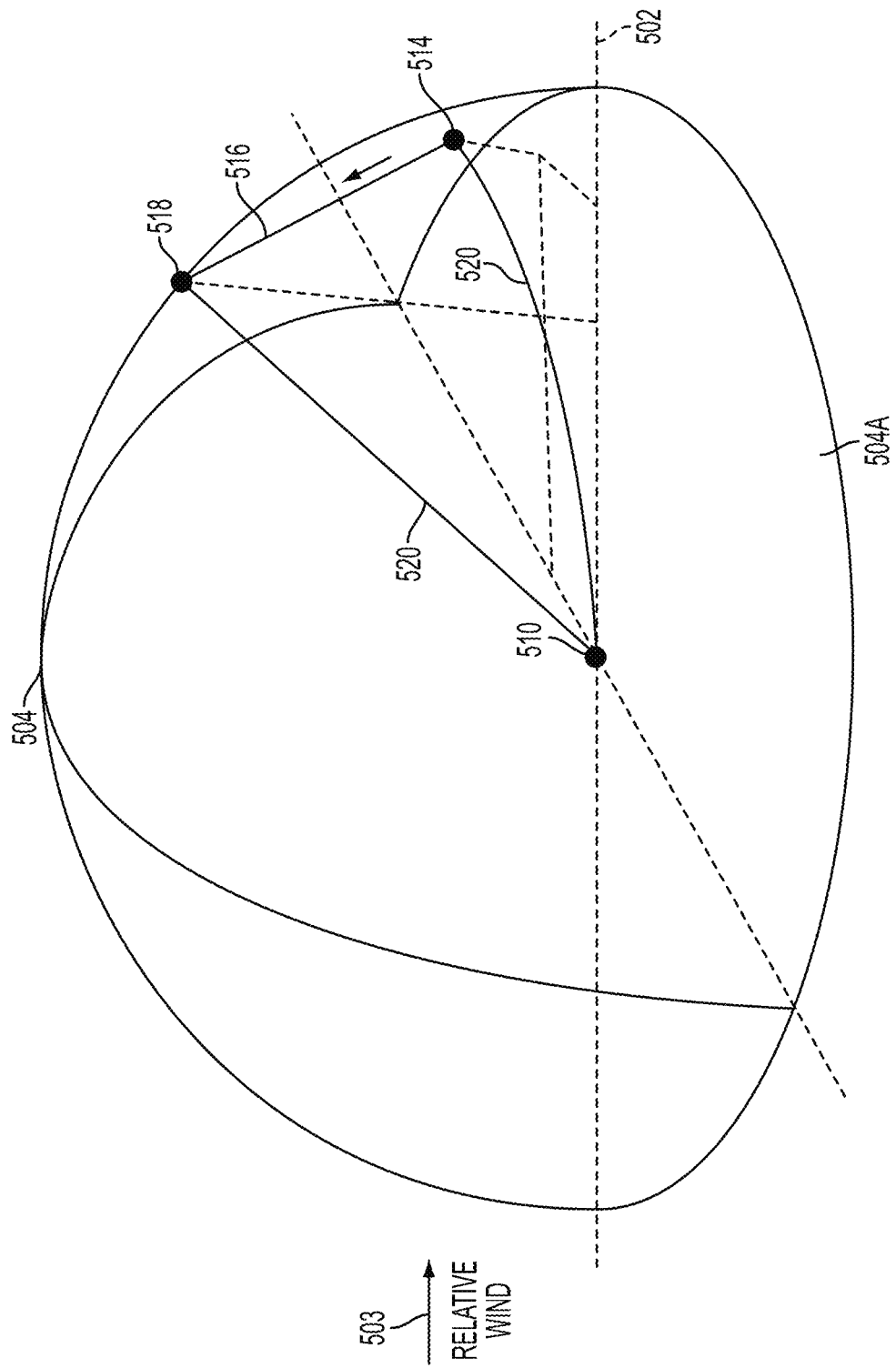

FIGS. 5A and 5B depict a tether sphere 504, according to an example embodiment. In particular, the tether sphere 504 has a radius based on a length of a tether 520, such as a length of the tether 520 when it is extended. As shown in FIGS. 5A and 5B, the tether 520 is connected to a ground station 510, and the ground station 510 is located on ground 502. Further, as shown in FIGS. 5A and 5B, relative wind 503 contacts the tether sphere 504. In FIGS. 5A and 5B, only a portion of the tether sphere 504 that is above the ground 502 is depicted. The portion may be described as one half of the tether sphere 504.

The ground 502 may take the form of or be similar in form to the ground 302, the tether sphere 504 may take the form of or be similar in form to the tether sphere 304, the ground station 510 may take the form of or be similar in form to the ground station 110 and/or the ground station 210, and the tether 520 may take the form of or be similar in form to the tether 120 and/or the tether 220.

Examples of transitioning an aerial vehicle between hover flight and crosswind flight described herein may be carried out in and/or substantially on a first portion 504A of the tether sphere 504. As shown in FIGS. 5A and 5B, the first portion 504A of the tether sphere 504 is substantially downwind of the ground station 510. The first portion 504A may be described as one quarter of the tether sphere 504. The first portion 504A of the tether sphere 504 may take the form of or be similar in form to the portion 304A of the tether sphere 304.

Moreover, examples of transitioning an aerial vehicle between hover flight and crosswind flight described herein may be carried out at a variety of locations in and/or on the first portion 504A of the tether sphere 504. For instance, as shown in FIG. 5A, while the aerial vehicle is in a hover-flight orientation, the aerial vehicle may be positioned at a point 508 that is substantially on the first portion 504A of the tether sphere 504.

Further, as shown in FIG. 5B, when the aerial vehicle transitions from the hover-flight orientation to a forward-flight orientation, the aerial vehicle may be positioned at a point 514 that is inside the first portion 504A of the tether sphere 504. Further still, as shown in FIG. 5B, when the aerial vehicle ascends in the forward-flight orientation to a point 518 that is substantially on the first portion 504A of the tether sphere 504, the aerial vehicle may follow a path 516. The path 516 may take the form of a variety of shapes. For instance, the path 516 may be a line segment, such as a chord of the tether sphere 504. Other shapes and/or types of shapes are possible as well.

The point 508 may correspond to point 308 in example 300, the point 514 may correspond to point 314 in example 300, the point 518 may correspond to point 318C in example 300, and the path 516 may take the form of or be similar in form to the path 316.

Further, in accordance with this disclosure, the point 508 and the point 518 may be located at various locations that are substantially on the first portion 504A of the tether sphere 504, and the point 514 may be located at various locations that are inside the first portion 504A of the tether sphere 504.

D. Transitioning an Aerial Vehicle from Crosswind Flight to Hover Flight

Figure 6A:
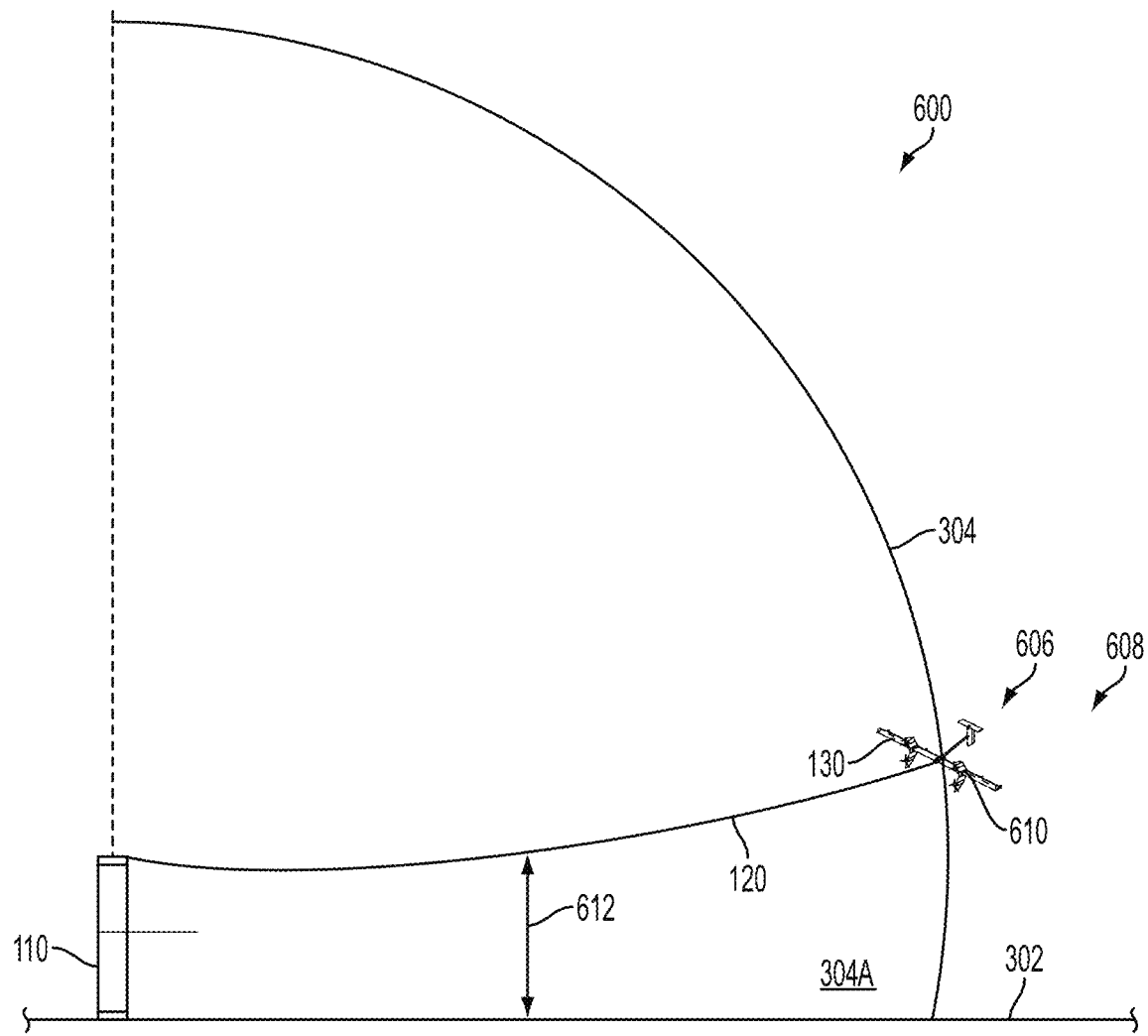
FIGS. 6A-C depict an example of an aerial vehicle transitioning from crosswind flight to hover flight, according to an example embodiment.
Figure 6B:
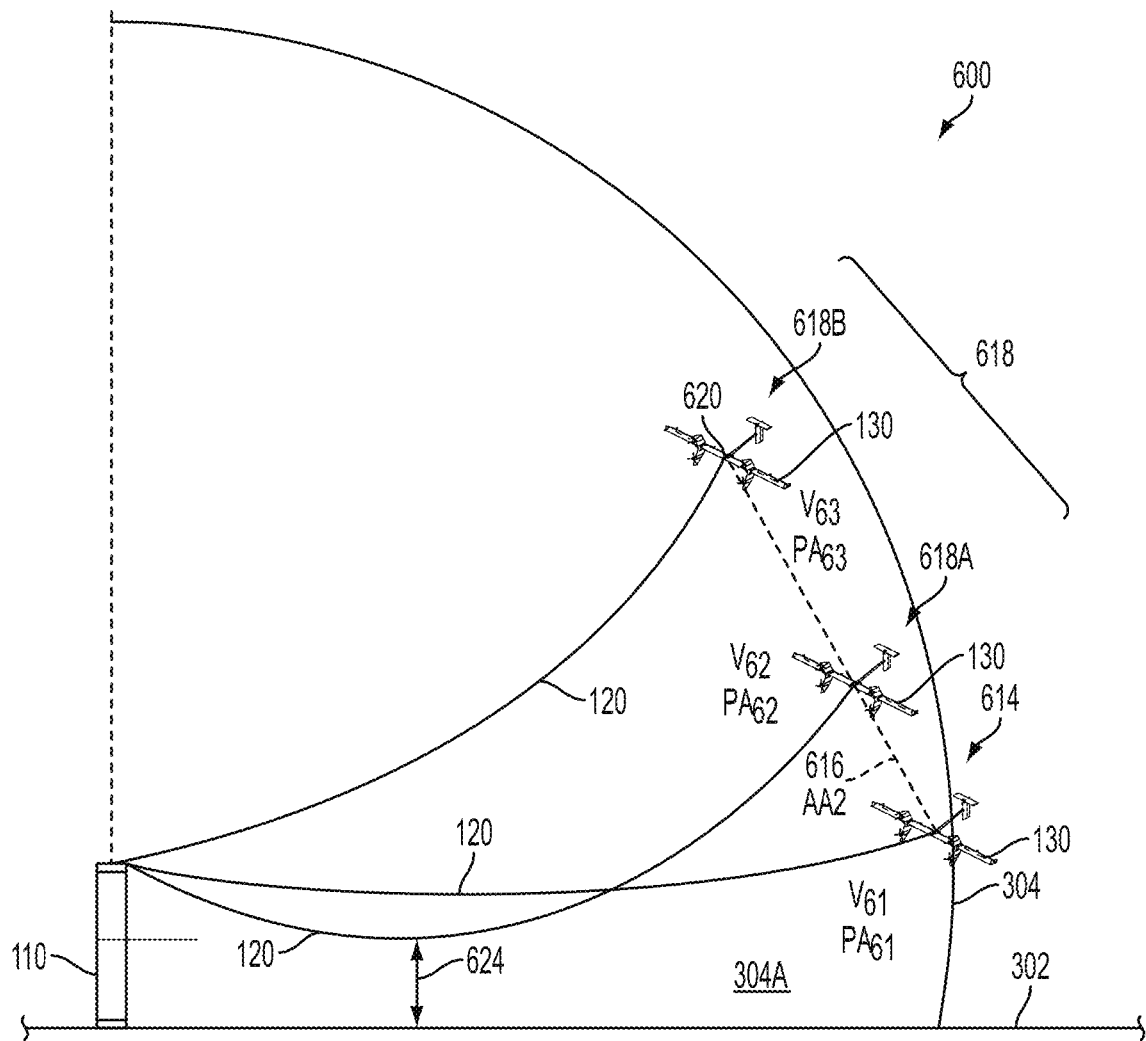
Figure 6C:
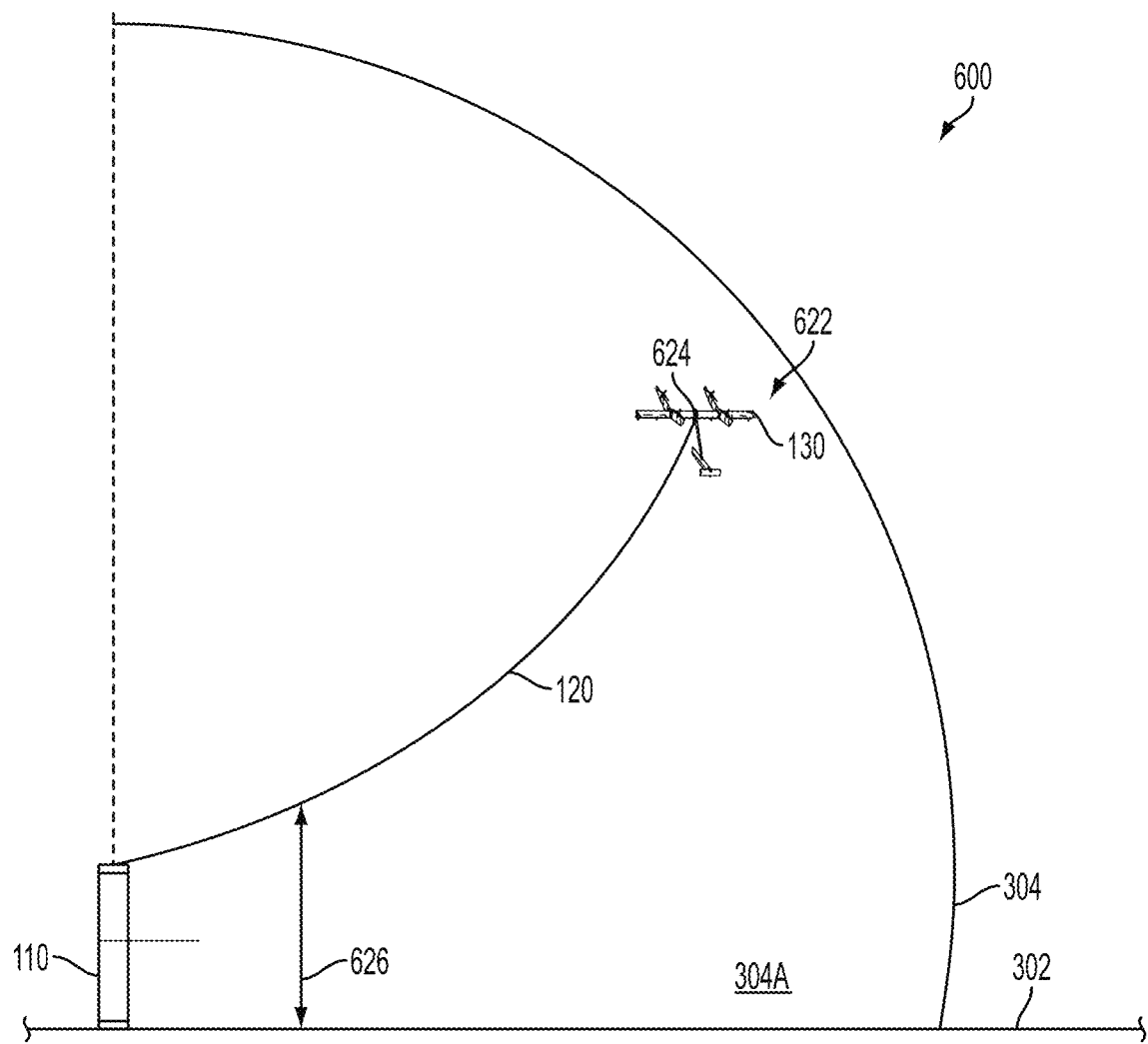

FIGS. 6A-C depict an example 600 of transitioning an aerial vehicle from crosswind flight to hover flight, according to an example embodiment. Example 600 is generally described by way of example as being carried out by the aerial vehicle 130 described above in connection with FIG. 1. For illustrative purposes, example 600 is described in a series of actions of the aerial vehicle 130 as shown in FIGS. 6A-C, though example 600 could be carried out in any number of actions and/or combination of actions.

As shown in FIG. 6A, the aerial vehicle 130 is connected to the tether 120, and the tether 120 is connected to the ground station 110. The ground station 110 is located on the ground 302. Moreover, as shown in FIG. 6A, the tether 120 defines the tether sphere 304. Example 600 may be carried out in and/or substantially on the portion 304A of the tether sphere 304.

Example 600 begins at a point 606 with operating the aerial vehicle 130 in a crosswind-flight orientation. When the aerial vehicle is in the crosswind-flight orientation, the aerial vehicle 130 may engage in crosswind flight. Moreover, at point 606 the tether 120 may be extended.

Example 600 continues at a point 608 with while the aerial vehicle 130 is in the crosswind-flight orientation, positioning the aerial vehicle 130 at a first location 610 that is substantially on the tether sphere 304. (In some examples, the first location 610 may be referred to as a third location). As shown in FIG. 6A, the first location 610 may in the air and substantially downwind of the ground station 110. The first location 610 may take the form of or be similar in form to the first location 310. However, in some examples, the first location 610 may have an altitude that is greater than an altitude of the first location 310.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

Moreover, at point 606 and point 608, a bottom of the tether 120 may be a predetermined altitude 612 above the ground 302. With this arrangement, at point 606 and point 608 the tether 120 may not contact the ground 302. The predetermined altitude 612 may be greater than, less than, and/or equal to the predetermined altitude 312.

Example 600 continues at a point 614 with transitioning the aerial vehicle from the crosswind-flight orientation to a forward-flight orientation, such that the aerial vehicle 130 moves from the tether sphere 120. As shown in FIG. 6B, the aerial vehicle 130 may move from the tether sphere 304 to a location toward the ground station 110.

When the aerial vehicle 130 is in the forward-flight orientation, the aerial vehicle may engage in forward flight. In some examples, transitioning the aerial vehicle 130 from the crosswind-flight orientation to the forward-flight orientation may involve a flight maneuver, such as pitching forward. Further, in such an example, the flight maneuver may be executed within a time period, such as less than one second.

At point 614, the aerial vehicle 130 may achieve attached flow. Further, at point 314, a tension of the tether 120 may be reduced. With this arrangement, a curvature of the tether 120 at point 614 may be greater than a curvature of the tether 120 at point 608.

Example 600 continues at one or more points 618 with operating the aerial vehicle 130 in the forward-flight orientation to ascend at an angle of ascent AA2 to a second location 620. (In some examples, the second location 620 may be referred to as a fourth location). As shown in FIG. 6B, the aerial vehicle 130 may fly substantially along a path 616 during the ascent at one or more points 618. In this example, one or more points 618 includes two points, a point 618A and point 618B. However, in other examples, one or more points 618 may include less than two or more than two points.

In some examples, the angle of ascent AA2 may be an angle between the path 618 and the ground 302. Further, the path 616 may take various different forms in various different embodiments. For instance, the path 616 may a line segment, such as a chord of the tether sphere 304. Other shapes and/or types of shapes are possible as well. The angle of ascent AA2 may take the form of or be similar in form to the angle of ascent AA1, and the path 616 may take the form of or be similar in form to the path 316.

In some implementations, at one or more points 618, the aerial vehicle 130 may ascend with substantially no thrust provided by the rotors 134A-D of the aerial vehicle 130. With this arrangement, the aerial vehicle 130 may decelerate during the ascent. For instance, at one or more points 618, the rotors 134A-D of the aerial vehicle 130 may be shutoff. The term "substantially no," as used in this disclosure, refers to exactly no and/or one or more deviations from exactly no that do not significantly impact transitioning between certain flight modes as described herein.

Moreover, in some implementations, the aerial vehicle 130 may have attached flow during the ascent. And in such an implementation, effectiveness of one or more control surfaces of the aerial vehicle 130 may be maintained. Further, in such an implementation, example 600 may involve selecting a maximum angle of ascent, such that the aerial vehicle 130 has attached flow during the ascent. Moreover, in such an implementation, example 600 may involve adjusting a pitch angle of the aerial vehicle based on the maximum angle of ascent and/or adjusting thrust of the aerial vehicle 130 based on the maximum angle of ascent. In some examples, the adjusting thrust of the aerial vehicle 130 may involve using differential thrusting of one or more of the rotors 134A-D of the aerial vehicle 130.

As shown in FIG. 6B, at point 614 the aerial vehicle 130 may have a speed V61 and a pitch angle PA61; at point 618A the aerial vehicle 130 may have a speed V62 and a pitch angle PA62; and at point 618B the aerial vehicle 130 may have a speed V63 and a pitch angle PA63.

In some implementations, the angle of ascent AA2 may be selected before point 618A. With this arrangement, the pitch angle PA61 and/or the pitch angle PA62 may be selected based on the angle of ascent AA2. Further, in some examples, the pitch angle PA62 and the pitch angle PA63 may be equal to the pitch angle PA61. However, in other examples, the pitch angles PA61, PA62, and PA63 may be different than each other. For instance, PA61 may be greater or less than PA62 and/or PA63; PA62 may be greater or less than PA63 and/or PA61; and PA63 may be greater or less than PA61 and/or PA62. Further, PA63 may be selected and/or adjusted during the ascent. Further still, PA61 and/or PA62 may be adjusted during the ascent.

Moreover, in some implementations, the speed V61 and/or the speed V62 may be selected based on the angle of ascent AA2. Further, in some examples, the speed V62, and the speed V63 may be equal to the speed V61. However, in other examples, the speeds V61, V62, V63 may be different than each other. For example, the speed V63 may be less than the speed V62, and the speed V62 may be less than the speed V61. Further, speeds V61, V62, and V63 may be selected and/or adjusted during the ascent.

In some implementations, any of speeds V61, V62, and/or V64 may be a speed that corresponds with a minimum (or no) throttle of the aerial vehicle 130. Further, in some implementations, at the speed V62, the aerial vehicle 130 may ascend in a forward-flight orientation. Moreover, at the speed V62, the angle of ascent AA2 may be converged. As shown in FIG. 6, the second location 620 may be in the air and substantially downwind of the ground station 110. The second location 620 may be oriented with respect to the ground station 110 a similar way as the first location 610 may be oriented with respect to the ground station 110.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 610 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis.

At one or more points 618, a tension of the tether 120 may increase during the ascent. For example, a tension of the tether 120 at point 618B may be greater than a tension of the tether at point 618A, and a tension of the tether at point 618A may be greater than a tension of the tether at point 614.

With this arrangement, a curvature of the tether 120 may decrease during the ascent. For example, a curvature the tether 120 at point 618B may be less than a curvature of the tether 120 at point 618A. Further, in some examples, a curvature of the tether 120 at point 618A may be less than a curvature of the tether 120 at point 614.

Moreover, in some examples, when the aerial vehicle 130 includes a GPS receiver, operating the aerial vehicle 130 in the forward-flight orientation to ascend at an angle of ascent may involve monitoring the ascent of the aerial vehicle with the GPS receiver. With such an arrangement, control of a trajectory of the aerial vehicle 130 during the ascent may be improved. As a result, the aerial vehicle 130's ability to follow one or more portions and/or portions of the path 616 may be improved.

Further, in some examples, when the aerial vehicle 130 includes at least one pitot tube, operating the aerial vehicle 130 in the forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle 130 during the ascent may be improved. As a result, the aerial vehicle's ability to follow one or more portions and/or points of the path 616 may be improved.

Moreover, as shown in FIG. 6B, at point 614 and point 618 a bottom of the tether 120 may be a predetermined altitude 624 above the ground 302. With this arrangement, at point 614 and point 618 the tether 120 may not touch the ground 302. In some examples, the predetermined altitude 624 may be less than the predetermined altitude 612. And the predetermined altitude 624 may be greater than, less than, and/or equal to the predetermined the predetermined altitude 324. In some implementations, the predetermined altitude 624 may be greater than one half of the height of the ground station 110. And in at least one such implementation, the predetermined altitude 624 may be 6 meters.

Example 600 continues at a point 622 with transitioning the aerial vehicle 130 from the forward-flight orientation to a hover-flight orientation. In some examples, transitioning the aerial vehicle 130 from the forward-flight orientation to the hover-flight orientation may involve a flight maneuver. Further, transitioning the aerial vehicle 130 from the forward-flight orientation to the hover-flight orientation may occur when the aerial vehicle 130 has a threshold speed, such as 15 m/s. In some implementations, transitioning the aerial vehicle 130 from the forward-flight orientation to the hover-flight orientation may occur when the speed V63 is 15 m/s. Further, at point 622, a tension of the tether 120 may be greater than a tension of the tether at point 618B.

During the transition from the forward-flight orientation to the hover-flight orientation, the aerial vehicle 130 may be positioned at third location 624 (In some examples, the third location 624 may be referred to as a fifth location). As shown in FIG. 6C, the third location 624 may be in the air and substantially downwind of the ground station 110. In some implementations, the third location 624 could be the same as or similar to the second location 620. When the third location 624 is not substantially on the tether sphere 304, after point 622 the aerial vehicle 130 may be blown by the wind to a fourth location (not shown) that is substantially on the tether sphere 304.

Moreover, as shown in FIG. 6C, at point 622 a bottom of the tether 120 may be a predetermined altitude 626 above the ground 302. With this arrangement, at point 626 the tether 120 may not touch the ground 302. In some examples, the predetermined altitude 626 may be greater than the predetermined altitude 612 and/or the predetermined altitude 624.

Thus, example 600 may be carried out so that the tether 120 may not contact the ground 602. With such an arrangement, the mechanical integrity of the tether 120 may be improved. For example, the tether 120 might not catch on (or tangle around) objects located on the ground 302. As another example, when the tether sphere 304 is located above a body of water described herein, the tether 120 might not be submersed in the water. In addition, with such an arrangement, safety of one or more people located near the ground station 110 (e.g., within the portion 304A of the tether sphere 304) may be improved.

In addition, example 600 may be carried out so that a bottom of the tether 120 remains above the predetermined altitude 624. With such an arrangement, the mechanical integrity of the tether 120 may be improved as described herein and/or safety of one or more people located near the ground station may be improved.

Moreover, one or more actions that correspond with points 606-622 may be performed at various different time periods in various different embodiments. For instance, the one or more actions that correspond with point 606 may be performed at a first time period, the one or more actions that correspond with point 608 may be performed at a second time period, the one or more actions that correspond with point 614 may be performed at a third time period, the one or more actions that correspond with point 618A may be performed at a fourth time period, the one or more actions that correspond with point 618B may be performed at a fifth time period, and the one or more actions that correspond with point 622 may be performed at a seventh time period. However, in other examples, at least some of the actions of the one or more actions that correspond with points 606-622 may be performed concurrently.

Although example 600 has been described above with reference to FIGS. 6A-C, in accordance with this disclosure, point 608 and point 622 may occur at various locations that are substantially on the portion 304A of the tether sphere 304, and point 614 and one or more points 618 may occur at various locations that are inside the portion 304A of the tether sphere.

III. OFFSHORE AIRBORNE WIND TURBINE SYSTEMS

Airborne wind turbines may provide a significant advantage over conventional wind turbines when it comes to offshore power generation. In particular, strong, consistent winds may be found in deep offshore locations (e.g., in water that is 30 meters deep or deeper). However, for offshore applications, conventional wind turbines typically have towers extending from above the ocean surface down to the seabed. The deeper the water, the greater the size of the tower, and the greater the moment about the base of the tower caused by the spinning turbine blades. Therefore, the use of conventional wind turbines for deep water applications may not be viable because the cost of building and/or installing such towers may be prohibitively expensive in many offshore locations.

Example embodiments herein are directed to an airborne wind turbine system where the aerial vehicle may be attached by a tether that extends through a floating platform to an underwater anchor, so there is no large moment caused by the flying aerial vehicle on a tall tower anchored to the seabed. This is particularly advantageous in deep offshore applications.

In one embodiment, the tether is routed through the floating platform such that the tether is free to move through the floating platform along some portion of the length of the tether, yet the tether is still constrained by the floating platform such that when the tether is dragged laterally across the water surface by the aerial vehicle, the floating platform may be dragged along as well.

In another embodiment, the tether is routed through the floating platform, but captured by a tether drive that is part of the floating platform. The aerial vehicle may still drag the platform across the water, but the tether drive may also move the tether through and relative to the floating platform, effectively changing the distance (as measured along the length of the tether) between the floating platform and the anchor, between the floating platform and the aerial vehicle, or both. In embodiments with a tether drive, a friction drive or motorized drum, as non-limiting examples, may be used to move and/or store the tether as it extends out or is retracted towards the floating platform. In preferred embodiments, the drum may rotate about a horizontal axis.

In the various embodiments, the floating platform may be relatively small because when the aerial vehicle is in flight, the airborne wind turbine system is insensitive to sway at the top of the buoy caused by wave action or wind. In other words, during crosswind flight, it may not matter if the top of the floating platform sways above the surface of the water.

A ballast or mass may be provided at the bottom of the floating platform to help maintain the platform in an upright position to provide stability during takeoff and landing. As examples, the mass may be water, fill, steel, or concrete positioned in the bottom of the platform to provide stability. Preferably the floating platform may be a spar buoy design that presents a low cross-sectional area to the waves.

When the aerial vehicle is flying in crosswind flight, the aerial vehicle may pull the top of the floating platform towards the aerial vehicle and the floating platform may be biased to tip towards the aerial vehicle. In this manner, the pulling force of the aerial vehicle provides for a relatively straight tension load extending through the tether to the anchor. As used herein, "relatively straight" presumes the tension to be through the tether while it is catenary under tension or perfectly straight under tension.

The ability to of the platform to tip is also an advantage because the aerial vehicle may fly in loops, where the aerial vehicle is climbing for part of the loop, and going down for part of the loop. So by having a system where you are actually lifting and lowering the entire platform, energy is being stored. Therefore, because the platform can tip and is more compliant than a land based design, potential energy can be stored that helps even out the energy that the aerial vehicle is putting out. Therefore, the motors on the aerial vehicle are working at a more consistent level.

Furthermore, when the aerial vehicle is in circular flight, the oscillation of the floating platform may trail the movement of the vehicle, such that there is a time when the vehicle is on the upstroke and the floating platform is moving down, and vice versa on the downstroke. This relative movement may dampen the movement of the aerial vehicle, as well as the oscillation of the floating platform. The net result may be to cause energy generation to be more stable as typically there is oscillation (more power generation on upstroke, less on downstroke). Advantageously, the aerial vehicle can be built to have a period of flight loop that falls within the same structural dead band of the floating platform as the 50 or 100 year wave period. For example, the period of the 50 year wave might be 17 seconds, and the period of loop flown by the AWT might be between 10 and 20 seconds depending on wind speeds, and the floating platform might be built to have its most significant resonance in terms of response to tension or wave action on a 35 second period.

The floating platform has a natural resonance based on its mass and waterline diameter, such that it will bob up and down in the water at a certain frequency. The floating platform system may preferably be relatively well damped so that it does not strongly resonate either with wave motion or with the motion of the aerial vehicle. Beneficially, the resonant frequencies can be set outside of those frequencies introduced by wave motion or by the aerial vehicle's flight and variation in tension and direction of force. A heave plate may be positioned horizontally about the floating platform to provide damping. The diameter of the structure at waterline can be modified to achieve a beneficial response of the system. Beneficially, the heave plate may be configured so as to damp heave motions in the platform, but be placed horizontally so as to limit damping of pitch motions of the platform which might help store energy with only a partial loss to damping, as the aerial vehicle flies loops.

FIG. 7 depicts an offshore airborne wind turbine system 700 according to an example embodiment. Aerial vehicle 704 is shown in flight and may be the same or similar to aerial vehicles described above with respect to FIGS. 1 to 6C. As illustrated, aerial vehicle 704 is in a crosswind flight mode flying an example elliptical path.

A tether 708 connects the aerial vehicle 702 to an underwater anchor 706. The tether 708 may be the same or similar to tethers described above with respect to FIGS. 1 to 6C and preferably contains a set of insulated electrical conductors. The tether 708 may contain one or more insulated conductors that allow transmission of electrical power to and from the aerial vehicle 704. The tether 708 may be electrically connected to an electrical junction box 712 that is in proximity to the anchor 706. The junction box 712 may be connected to an energy storage system and/or an electrical energy grid system. The tether 708 may further include optical or other communication conduits that allow communication with the aerial vehicle 704. The tether 708 may be capable of carrying tension loads sufficient to restrain the aerial vehicle during all flight modes, including crosswind flight and heavy gusts. The tether 708 may further be insulated and protected against electrical leakage into the water environment and sufficiently resilient to resist abrasion and physical wear both from contact with other components in the system and natural structures such as the seabed.

The anchor 706 may be any anchor type that is sufficient to resist the pulling force of the aerial vehicle 704 during any flight mode. The anchor 706 is preferably a gravity anchor positioned at the seabed. The anchor 706 is illustrated as a pyramid anchor, though other gravity anchors such as mushroom anchors are also acceptable. Other examples of anchor 706 include a helical screw anchor, suction bucket, and piles such as drilled and grouted piles, pin piles, hammered piles, etc. The anchor 706 may include an electrical termination for the tether 708 with a corresponding electrical link to the junction box 712, or the anchor 706 may merely capture and restrain the tether 708 and allow it to terminate at the junction box 712 or elsewhere. To secure the tether end sufficient to resist the pulling force of the aerial vehicle 704 during any flight mode, the anchor 706 may, for example, include one or more clamps, fixtures, or connectors configured to hold the tether 708 through compressive forces, mating connectors, or other means.

FIG. 7 additionally illustrates an example floating landing platform 702 for the aerial vehicle 704. The platform 702 is free floating except to the extent that it is restrained by the tether 708 passing from the aerial vehicle 704 to the anchor 706. The platform 702 may include an aerial vehicle perch 710 which may extend from the platform 702. The perch 710 may be the same or similar to perches described above with respect to FIGS. 1 to 6C. In this example, the platform is illustrated as a spar buoy with the tether 708, which extends between the aerial vehicle 704 and the anchor 706, acting as the spar buoy mooring line to the anchor 706. Other example forms of the platform 702 are also possible where the tether 708, which extends between the aerial vehicle 704 and the anchor 706, acts as the mooring line to the anchor 706. As non-limiting examples, the platform 702 may take the general form of a barge platform or an elevated platform with multiple pontoons. The spar buoy form provides benefits in that it provides buoyancy sufficient to carry the weight of the landed aerial vehicle 704 while presenting a low cross-section to wave action.

As illustrated, the tether 708 passes through the central interior of the platform 702. However, the tether may instead pass through another portion of the platform, for example, a tube on an exterior surface of the platform or a tether drive (discussed below) that is part of the platform 702. In any case, tether 708 exhibits a relatively straight tension path between a pulling force of the aerial vehicle 704 and the grounding force of anchor 706, with allowance made for and catenary of the tether 708 while under tension.

The tether 708 may pass through the platform 702 along a reference axis. The reference axis may generally be considered a hypothetical path along which the tether 708 passes through the platform 902 and along which tension acts between the aerial vehicle 704 and the anchor 706. Preferably the reference axis is aligned with the aerial vehicle 704 and anchor 706 when the aerial vehicle 704 is in flight. Accordingly, the platform 702 may tip (as illustrated), the portion of the platform 702 that the tether 708 passes through may tip relative to the platform, and/or the platform 702 may have an aperture (or apertures) large enough to allow the tether 708 to pass through at an oblique angle to the platform without tipping the platform while the aerial vehicle is in flight.

As illustrated, the tether 708 has a lower portion extending below the floating platform 702 (from the floating platform 702 to the anchor 706) and an upper portion extending above the floating platform 702 (from the floating platform 702 to the aerial vehicle 704). For a given installation, the relative lengths of the upper and lower portions of the tether 708 may change as the aerial vehicle 704 moves towards and away from the floating platform. As used herein, the term "length" when used in reference to the upper and lower portions of the tether may be understood to refer to the length along the tether extending, respectively, above and below the floating platform 702. As illustrated in FIG. 7, where the aerial vehicle 704 is in crosswind flight, there may be a relatively short length of tether 708 below the floating platform and a relatively long length of tether 708 above the platform 702. The reverse example is illustrated in FIG. 8, where the aerial vehicle 704 is landed on the platform 702. As illustrated in FIG. 8, when the aerial vehicle 704 has landed, the tether 708 may accumulate below the floating platform 702, leaving very little tether 708 exposed above the platform. The converse may also be true. For example when the aerial vehicle 704 moves from a landed position to a crosswind position, the length of tether 708 above the platform 702 may increase and the length of tether 708 below the platform 702 may decrease. The tether 708 may rest partially on the seabed or remain suspended between the anchor 706 and platform 702 depending on the location of the platform 702 relative to the anchor 706 and the length of the tether 708.

As a flying aerial vehicle 704 (as illustrated in FIG. 7) moves toward the platform 702 and transitions to a landed vehicle configuration (as illustrated in FIG. 8), the length of the upper portion of tether 708 may decrease and the length of the lower portion of tether 708 may increase. The tether 708 may move freely through the platform 702, or a tether drive may move the tether 708 through the platform 702. Contextually, movement of the tether 708 through the platform 702 may include both moving a partial length of the tether 708 completely through the platform (e.g., see FIGS. 10 and 11A-b) or moving a partial length of the tether 708 through a portion of the platform 702 such that the length(s) of the upper and/or lower portions of the tether change (e.g., see FIG. 12). The latter may include accumulating a section of the tether 708 at the platform 702 or expelling a section of the tether 708 previously accumulated at the platform 702.

A. Floating Platform with Freely Moving Tether

Figure 9:
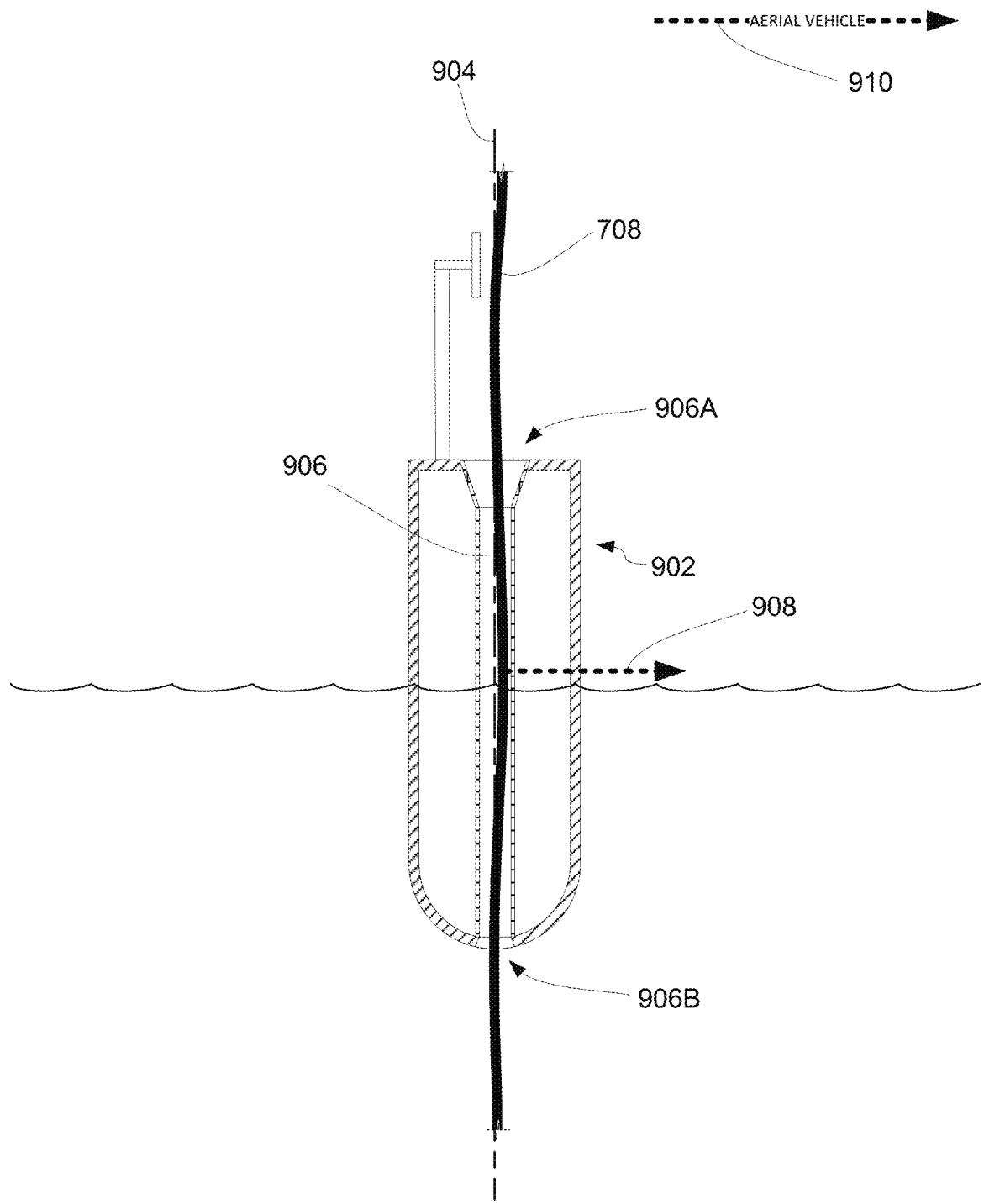
FIG. 9 depicts a side cutaway view of a floating platform in an offshore airborne wind turbine system.

FIG. 9 depicts a side cutaway view of a floating platform in an offshore airborne wind turbine system. Floating platform 902 may be the same as floating platform 702. An opening 906 may extend through the platform 902 and be bounded by apertures 906A and 906B. The opening 906 may be configured to allow the tether 708 to pass through the platform 902. In the example embodiment illustrated in FIG. 9, the tether 708 may move freely through the platform 902 along the reference axis 904, i.e., the tether 708 can slide through the platform 902 as the platform 902 moves relative to the anchor 706 and/or as the aerial vehicle 704 moves relative to the platform 902. However, as illustrated, the tether 708 is captured by the platform 902 such that the tether 708 is constrained in movement relative to the platform 902 in a plane generally perpendicular to the reference axis 904. Accordingly, movement of the aerial vehicle 704 during flight in a lateral direction, i.e., across the surface of the water, may cause a corresponding lateral force from the tether 708 against the platform 902. As illustrated, movement of the aerial vehicle 704 in the direction illustrated by arrow 910 may result in a lateral force from the tether 708 against the platform 902 in the direction illustrated by arrow 908. A vector portion of the lateral force from the tether 708 against the platform 902 may tilt the top of the platform 902 towards the aerial vehicle 704 (as illustrated in FIG. 7). Additionally, a vector portion of the force may additionally drag the buoyant platform 902 across the water in the direction of movement of the aerial vehicle 704. Arrow 908 is illustrative of relative directionality only and is not meant to convey a specific location or magnitude of force acting on the platform 902. The force may be located across a portion of the platform and/or at multiple contact points.

B. Floating Platform with Friction Roller Tether Drive

Figure 10:
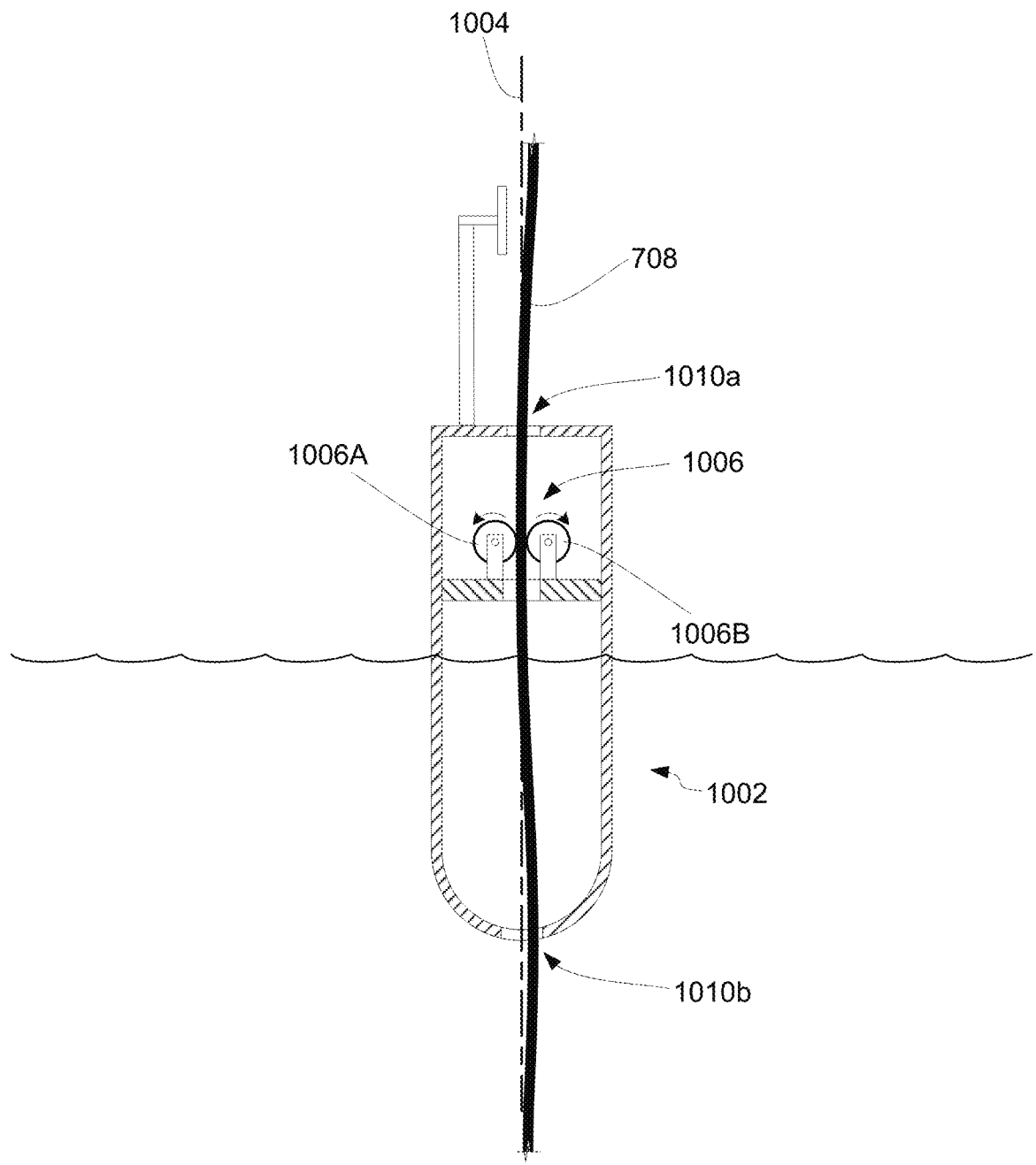
FIG. 10 depicts a side cutaway view of a floating platform in an offshore airborne wind turbine system.

FIG. 10 depicts a side cutaway view of a floating platform in an offshore airborne wind turbine system. Floating platform 1002 may be the same as floating platform 702. An opening bounded by apertures 1010a and 1010b may extend through the platform 1002 and may be configured to allow the tether 708 to pass through the platform 1002. The opening may be internally bounded by wall surfaces (not shown for clarity) to create buoyant compartments and/or buoyant materials may be included in the floating platform 1002. The platform 1002 may include a tether drive 1006 configured to move the tether 708 through the platform 1002 along the reference axis 1004. In effect, the tether drive 1006 may change the position of the platform 1002 relative to the anchor 706 and/or the aerial vehicle 704 by moving the tether 708 relative to the platform 1002. The tether 708 may be captured by the tether drive 1006 such that the tether 708 is constrained in movement relative to the platform 1002 in a plane generally perpendicular to the reference axis 1004. Accordingly, movement of the aerial vehicle 704 during flight in a lateral direction, i.e., across the surface of the water, may cause a corresponding lateral force from the tether 708 against the platform 1002, as described with respect to FIG. 9.

The tether drive 1006 may include one or more motorized friction rollers disposed against the tether 708, such as opposing friction rollers 1006A and 1006B. The tether drive 1006 may be configured to rotate one or more of the friction rollers 1006A and/or 1006B, causing the tether 708 to move relative to the platform 1002 and generally along the reference axis 1004. In the example illustration, the tether drive 1006 may drive friction roller 1006B in a clockwise direction, causing the tether 708 to move through and relative to the platform 1002 generally along the reference axis 1004 and increasing the length of the upper portion of the tether 708. Conversely, the tether drive 1006 may drive friction roller 1006B in the opposite direction, causing the tether 708 to move in the opposite direction and decreasing the he length of the upper portion of the tether 708. Optionally, the tether drive 1006 may drive both friction rollers 1006A and 1006B in opposing directions to provide greater motive force.

Different quantities of friction rollers are also contemplated. For example, a single friction roller may press against the tether 708 to provide a motive force, or a single friction roller may squeeze the tether 708 against a sliding surface to provide a motive force. Additional examples include multiple frictions rollers to provide extra traction and/or friction rollers on perpendicular planes to constrain the tether 708 in multiple axes. Tether drive 1006 may include guides that constrain the tether 708 in axes not constrained by friction rollers.

C. Floating Platform with Motorized Drum Tether Drive

Figures 11A, 11B:
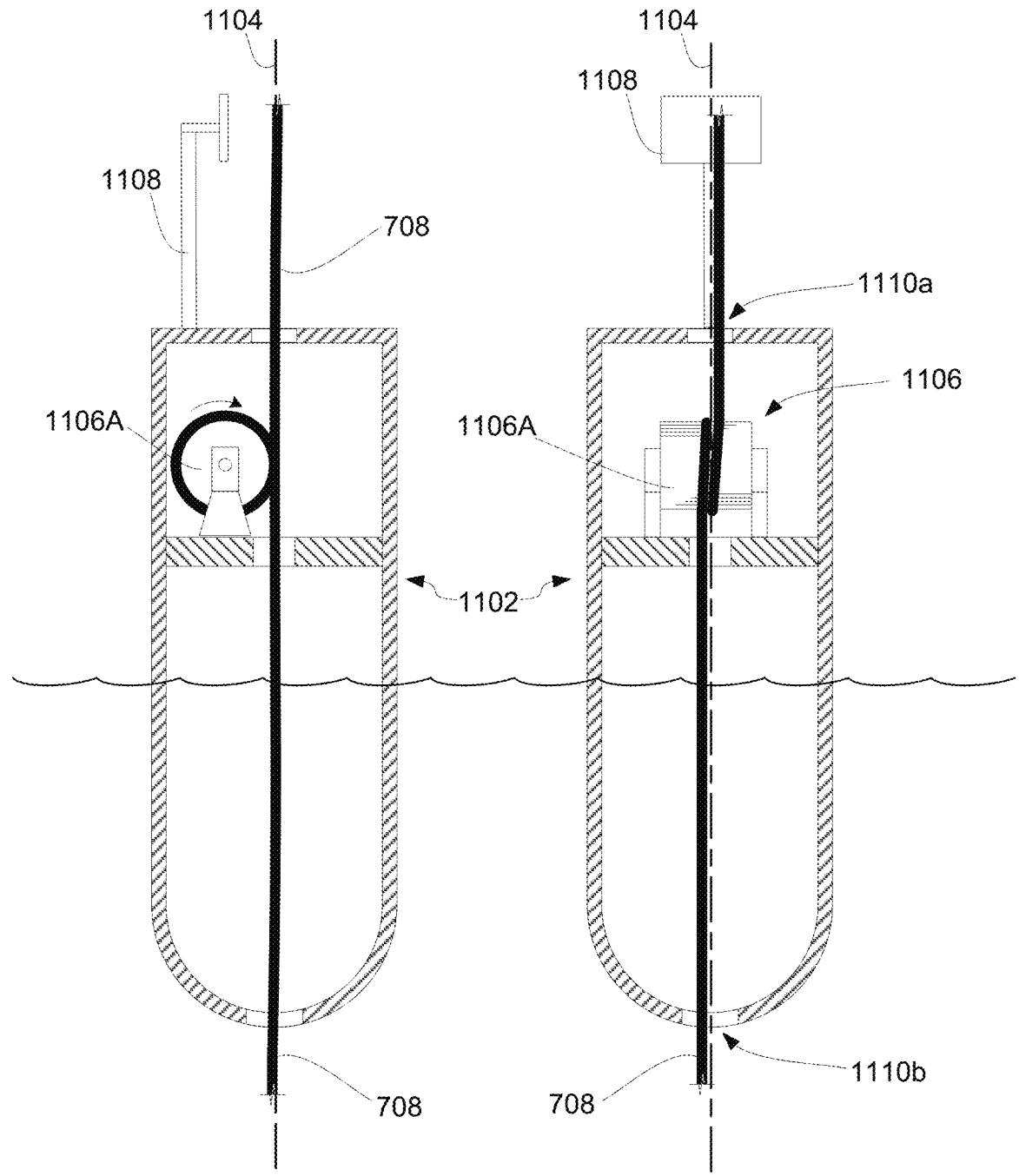
FIGS. 11A and 11B depict side and front, respectively, cutaway views of a floating platform in an offshore airborne wind turbine system.

FIGS. 11A and 11B depict side and front, respectively, cutaway views of a floating platform in an offshore airborne wind turbine system. Floating platform 1102 may be the same as floating platform 702, and may include perch 1108. An opening bounded by apertures 1110a and 1110b may extend through the platform 1102 and may be configured to allow the tether 708 to pass through the platform 1102. The opening may be internally bounded by wall surfaces (not shown for clarity) to create buoyant compartments and/or buoyant materials may be included in the floating platform 1102. The platform 1102 may include a tether drive 1106 configured to move the tether 708 through the platform 1102 along the reference axis 1104. In effect, the tether drive 1106 may change the position of the platform 1102 relative to the anchor 706 and/or the aerial vehicle 704 by moving the tether 708 relative to the platform 1102. The tether 708 may be captured by the tether drive 1106 such that the tether 708 is constrained in movement relative to the platform 1102 in a plane generally perpendicular to the reference axis 1104. Accordingly, movement of the aerial vehicle 704 during flight in a lateral direction, i.e., across the surface of the water, may cause a corresponding lateral force from the tether 708 against the platform 1102, as described with respect to FIG. 9.

The tether drive 1106 may include a motorized drum 1106A around which the tether 708 is circumferentially wrapped at least once such that rotation of the motorized drum 1106A results in rotation of the tether 708 about the motorized drum 1106A. The tether drive 1106 may be configured to rotate the motorized drum 1106A, thereby causing the tether 708 to move through the platform 1102 and generally along the reference axis 1104. In the example illustration, the tether drive 1106 may drive the motorized drum 1106A in a clockwise direction, causing the tether 708 to move through the platform 1002 and decreasing the length of the upper portion of the tether 708. Conversely, the tether drive 1106 may drive the motorized drum 1106A in the opposite direction, increasing the length of the upper portion of the tether 708. Tether drive 1106 may further include guides that constrain the tether 708 in axes not constrained by motorized drum 1106A.

D. Floating Platform with Counter-Wrapped Motorized Drum Tether Drive

Figure 12:
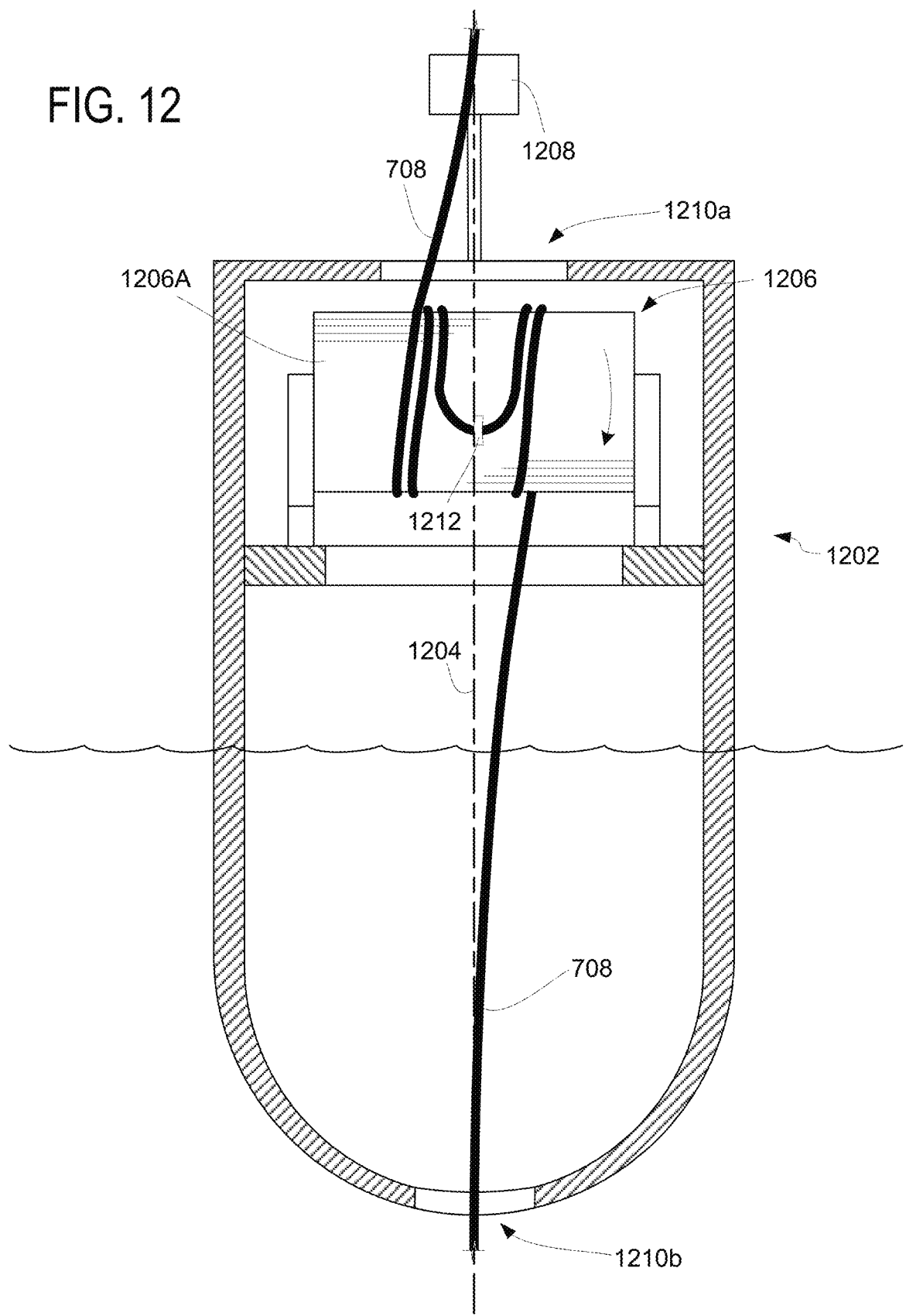
FIG. 12 depicts a front cutaway view of a floating platform in an offshore airborne wind turbine system.

FIG. 12 depicts a front cutaway view of a floating platform in an offshore airborne wind turbine system. Floating platform 1202 may be the same as floating platform 702, and may include perch 1208. An opening bounded by apertures 1210a and 1210b may extend through the platform 1202 and may be configured to allow the tether 708 to pass through the platform 1202. The opening may be internally bounded by wall surfaces (not shown for clarity) to create buoyant compartments and/or buoyant materials may be included in the floating platform 1202. The platform 1202 may include a tether drive 1206 configured to move the tether 708 through the platform 1202. In effect, the tether drive 1206 may change the position of the platform 1202 relative to the anchor 706 and/or the aerial vehicle 704 by moving the tether 708 relative to the platform 1202. The tether 708 may be captured by the tether drive 1206 such that the tether 708 is constrained in movement relative to the platform 1202 in a plane generally perpendicular to the reference axis 1204. Accordingly, movement of the aerial vehicle 704 during flight in a lateral direction, i.e., across the surface of the water, may cause a corresponding lateral force from the tether 708 against the platform 1202, as described with respect to FIG. 9.

The tether drive 1206 may include a motorized drum 1206A around which the tether 708 is circumferentially wrapped in opposing directions, with the upper portion of tether 708 wrapped in a first circumferential direction and the lower portion of tether 708 wrapped in an opposing circumferential direction. Rotation of the motorized drum 1206A results in rotation of the tether 708 further onto or off of the motorized drum 1206A. For example, the tether drive 1206 may be configured to rotate the motorized drum 1206A in the direction shown by the arrow in FIG. 12, causing the upper portion of the tether to decrease in length and causing the lower portion of the tether to also decrease in length. The tether drive 1206 may alternatively drive the motorized drum 1206A in the opposite direction, causing the upper and lower portions of tether 708 to move similarly in opposite directions and away from the motorized drum 1206A. Tether drive 1206 may further include guides that constrain the tether 708 in axes not constrained by motorized drum 1206A.

E. Floating Platform with Motorized Dual-Drum Tether Drive

Figure 13:
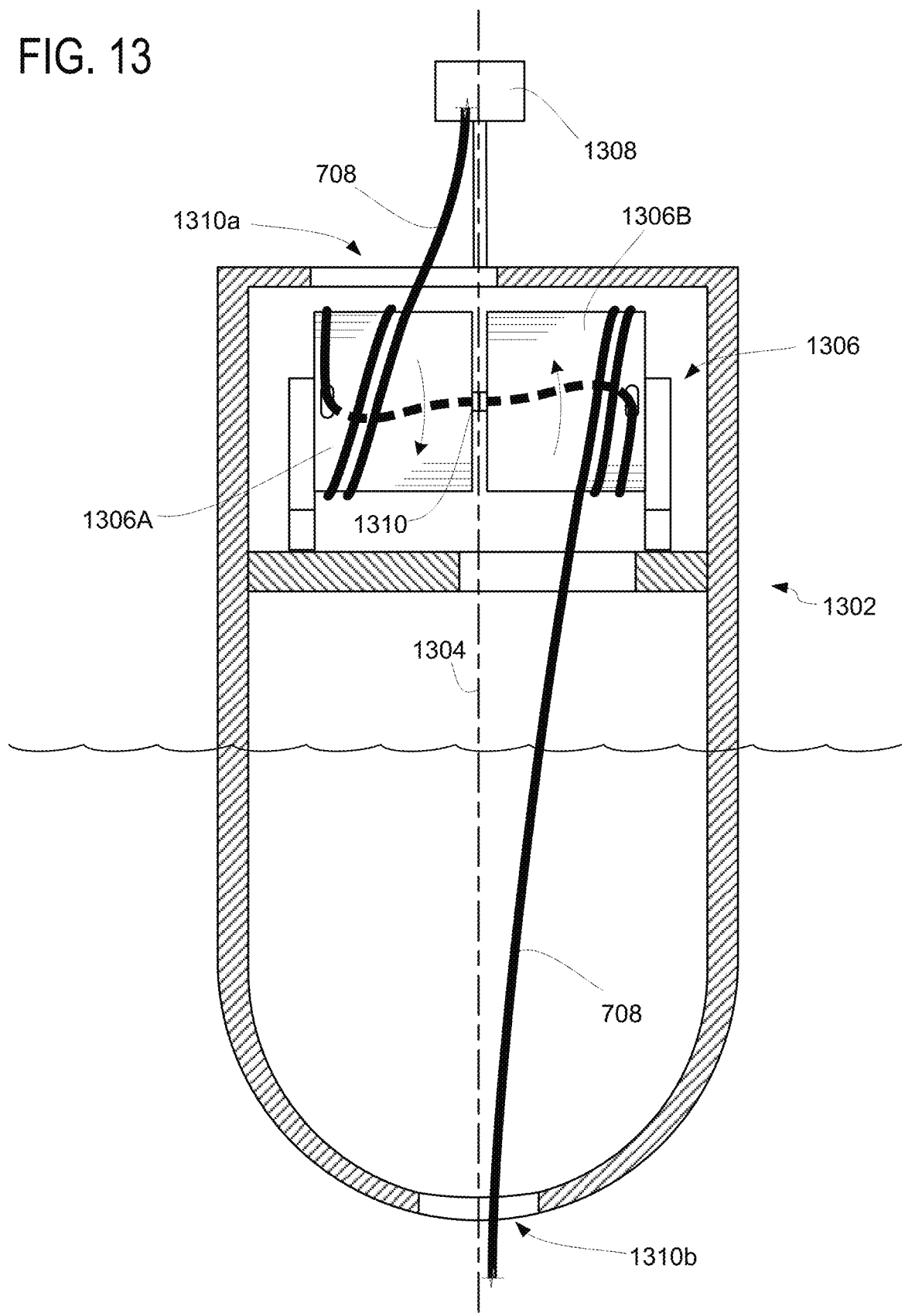
FIG. 13 depicts a front cutaway view of a floating platform in an offshore airborne wind turbine system.

FIG. 13 depicts a front cutaway view of a floating platform in an offshore airborne wind turbine system. Floating platform 1302 may be the same as floating platform 702, and may include perch 1308. An opening bounded by apertures 1310a and 1310b may extend through the platform 1302 and may be configured to allow the tether 708 to pass through the platform 1302. The opening may be internally bounded by wall surfaces (not shown for clarity) to create buoyant compartments and/or buoyant materials may be included in the floating platform 1302. The platform 1302 may include a tether drive 1306 configured to move the tether 708 through the platform 1302. In effect, the tether drive 1306 may change the position of the platform 1302 relative to the anchor 706 and/or the aerial vehicle 704 by moving the tether 708 relative to the platform 1302. The tether 708 may be captured by the tether drive 1306 such that the tether 708 is constrained in movement relative to the platform 1302 in a plane generally perpendicular to the reference axis 1304. Accordingly, movement of the aerial vehicle 704 during flight in a lateral direction, i.e., across the surface of the water, may cause a corresponding lateral force from the tether 708 against the platform 1302, as described with respect to FIG. 9.

The tether drive 1306 may include at least two motorized drums 1306A and 1306B. The tether drive 1306 may selectively drive one or both motorized drums 1306A and 1306B and my drive them in the same or opposing directions. The tether 708 may be circumferentially wrapped around drum 1306A and also wrapped around drum 1306B in either the same circumferential direction as drum 1306A (as illustrated) or the opposite direction (not shown). Rotation of either motorized drum 1306A or 1306B results in rotation of the tether 708 further onto or off of the respective motorized drum, depending on the direction the tether 708 is wrapped.

For example, the tether drive 1306 may be configured to drive the motorized drum 1306A in the direction indicated by its respective arrow in FIG. 13, causing the upper portion of tether 708 to decrease in length. The tether drive 1306 may be additionally configured to drive the motorized drum 1306B in the direction indicated by its respective arrow in FIG. 13, causing the lower portion of tether 708 to decrease in length. Driving the each of respective motorized drums 1306A and 1306B in the opposite direction of the example described above will cause the respective portion of the tether 708 to increase in length.

The tether 708 may include a slip ring 1310 disposed between a portion of the tether 708 that is wrapped around drum 1306A and a portion of the tether 708 that is wrapped around drum 1306B, allowing the respective drums and accompanying portions of wrapped tether 708 to rotate with independent direction and/or speed. Each of the motorized drums 1306A or 1306B may include channels to guide the tether 708 into a specific lay pattern. Each of the motorized drums 1306A or 1306B may include apertures that allow the tether 708 to pass through into the interior of the drums.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An offshore airborne wind turbine system, comprising:
    an aerial vehicle;
    an underwater anchor;
    a tether comprising:
        an insulated electrical conductor,
        an upper portion secured to the aerial vehicle, and
        a lower portion secured to the underwater anchor; and
    a floating platform configured as a landing platform for the aerial vehicle, wherein the tether passes through the floating platform along a reference axis and is captured by the floating platform such that the tether is constrained in movement relative to the floating platform in a plane perpendicular to the reference axis and the tether can freely move through the floating platform along the reference axis.

2. The system of claim 1, wherein the aerial vehicle, tether, anchor, and floating platform are arranged such that a pulling force of the aerial vehicle causes a tension load to extend through the tether between the aerial vehicle and the underwater anchor.

3. The system of claim 1, wherein the tether is constrained in movement relative to the floating platform such that lateral movement of the aerial vehicle during flight causes a corresponding lateral force from the tether against the floating platform.

4. The system of claim 1, wherein the underwater anchor is positioned at a seabed.

5. The system of claim 4, wherein the underwater anchor is an anchor selected from the group consisting of gravity anchor, mushroom anchor, pyramid anchor, helical screw, pile, and suction bucket.

6. The system of claim 1, wherein the floating platform comprises an aerial vehicle perch extending from the platform.

7. The system of claim 1, wherein the floating platform comprises a spar buoy.

8. The system of claim 1, wherein movement of the aerial vehicle during flight away from the floating platform causes the upper portion to increase in length and the lower portion to decrease in length, and wherein movement of the aerial vehicle during flight towards the floating platform causes the upper portion to decrease in length and the lower portion to increase in length.

9. An offshore airborne wind turbine system, comprising:
    an aerial vehicle;
    an underwater anchor;
    a tether comprising:
        an insulated electrical conductor,
        an upper portion secured to the aerial vehicle, and
        a lower portion secured to the underwater anchor; and
    a floating platform configured as a landing platform for the aerial vehicle, wherein the tether passes through the floating platform along a reference axis, wherein the floating platform comprises a tether drive that captures the tether and constrains movement of the tether relative to the floating platform in a plane perpendicular to the reference axis, and wherein the tether drive is configured to move the tether through the floating platform.

10. The system of claim 9, wherein the tether drive comprises a motorized friction roller disposed against the tether and the tether drive is configured to drive the friction roller in a first rotational direction, causing the tether to move through the floating platform in a first direction.

11. The system of claim 10, wherein the tether drive is also configured to drive the friction roller in a second rotational direction causing the tether to move through the floating platform in a second direction opposite the first direction.

12. The system of claim 9, wherein the tether drive comprises a motorized drum around which the tether is circumferentially wrapped at least once, wherein the tether drive is configured to drive the motorized drum in a first rotational direction causing the tether to move through the floating platform in a first direction.

13. The system of claim 12, wherein the tether drive is also configured to drive the motorized drum in a second rotational direction causing the tether to move through the floating platform in a second direction opposite the first direction.

14. The system of claim 9, wherein the tether drive comprises a motorized drum, wherein the upper portion of the tether wraps around the motorized drum in a first circumferential direction, wherein the lower portion of the tether wraps around the motorized drum in a second circumferential direction opposite the first circumferential direction, and wherein the tether drive is configured to drive the motorized drum in a first rotational direction causing the upper portion of the tether to decrease in length and causing the lower portion of the tether to decrease in length.

15. The system of claim 9, wherein the tether drive comprises a first motorized drum and a second motorized drum, wherein the upper portion of the tether wraps around the first motorized drum in a first circumferential direction, wherein the lower portion of the tether wraps around the second motorized drum in a second circumferential direction opposite the first circumferential direction, wherein the tether further comprises a slip-ring connection between the upper portion of the tether wrapped around the first motorized drum and the lower portion of the tether wrapped around the second motorized drum, wherein the tether drive is configured to drive the first motorized drum in a first rotational direction causing the upper portion of the tether to decrease in length, and wherein the tether drive is also configured to selectively drive the second motorized drum in the first rotational direction or a second rotational direction opposite the first rotational direction.

16. The system of claim 16, wherein driving the second motorized drum in the first rotational direction causes the lower portion of the tether to increase in length and driving the second motorized drum in the second rotational direction causes the lower portion of the tether to decrease in length.

17. The system of claim 9, wherein the tether drive comprises a first motorized drum and a second motorized drum, wherein the upper portion of the tether wraps around the first motorized drum in a first circumferential direction, wherein the lower portion of the tether around the second motorized drum in the first circumferential direction, wherein the tether further comprises a slip-ring connection between the upper portion of the tether wrapped around the first motorized drum and the lower portion of the tether wrapped around the second motorized drum, wherein the tether drive is configured to drive the first motorized drum in a first rotational direction causing the upper portion of the tether to decrease in length, and wherein the tether drive is also configured to selectively drive the second motorized drum in the first rotational direction or a second rotational direction opposite the first rotational direction.

18. The system of 17, wherein driving the second motorized drum in the first rotational direction causes the lower portion of the tether to decrease in length and driving the second motorized drum in the second rotational direction causes the lower portion of the tether to increase in length.

19. An offshore airborne wind turbine system, comprising:
an aerial vehicle;
an underwater gravity anchor positioned at a seabed;
a tether comprising:
 an insulated electrical conductor,
 an upper portion secured to the aerial vehicle, and
 a lower portion secured to the underwater anchor, wherein a pulling force of the aerial vehicle causes a tension load to extend axially through the tether between the aerial vehicle and the underwater anchor; and
a floating platform configured as a landing platform for the aerial vehicle, wherein the tether passes through the floating platform along a reference axis and is captured by the floating platform such that the tether is constrained in movement relative to the floating platform in a plane perpendicular to the reference axis and the tether can freely move through the floating platform along the reference axis.

* * * * *